United States Patent
Pi et al.

(10) Patent No.: US 8,301,956 B2
(45) Date of Patent: Oct. 30, 2012

(54) METHODS AND APPARATUS TO IMPROVE COMMUNICATION IN A RELAY CHANNEL

(75) Inventors: Zhouyue Pi, Richardson, TX (US); Farooq Khan, Allen, TX (US); Jiannan Tsai, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1037 days.

(21) Appl. No.: 12/286,453

(22) Filed: Sep. 30, 2008

(65) Prior Publication Data

US 2009/0254790 A1    Oct. 8, 2009

Related U.S. Application Data

(60) Provisional application No. 61/064,988, filed on Apr. 7, 2008, provisional application No. 61/071,048, filed on Apr. 9, 2008.

(51) Int. Cl.
*H04L 1/18* (2006.01)
*H04L 1/24* (2006.01)

(52) U.S. Cl. ....................... 714/749; 714/712

(58) Field of Classification Search .......... None
See application file for complete search history.

(56) References Cited

U.S. PATENT DOCUMENTS

| | | | |
|---|---|---|---|
| 6,700,867 B2 * | 3/2004 | Classon et al. ............. 370/216 |
| 7,079,489 B2 | 7/2006 | Massie et al. |
| 7,920,501 B2 | 4/2011 | Larsson et al. |
| 7,975,199 B2 * | 7/2011 | Chindapol et al. ........... 714/751 |
| 8,059,610 B2 * | 11/2011 | Li et al. ................... 370/334 |
| 8,099,123 B2 | 1/2012 | Tomasin et al. |
| 8,125,961 B2 | 2/2012 | Agrawal et al. |
| 2003/0066004 A1 | 4/2003 | Rudrapatna et al. |
| 2006/0179387 A1 | 8/2006 | Taffin et al. |
| 2007/0047437 A1 | 3/2007 | Bachl et al. |
| 2007/0189205 A1 * | 8/2007 | Terry et al. ................... 370/328 |
| 2008/0045141 A1 | 2/2008 | Suga |
| 2008/0080641 A1 * | 4/2008 | Kim ........................... 375/299 |
| 2009/0158110 A1 * | 6/2009 | Park et al. ..................... 714/748 |
| 2009/0304109 A1 * | 12/2009 | Kotecha ........................ 375/299 |

FOREIGN PATENT DOCUMENTS

| | | |
|---|---|---|
| JP | 2003-124915 | 4/2003 |
| JP | 2007259281 A * | 10/2007 |
| JP | 2008-017487 | 1/2008 |
| JP | 2008-048221 | 2/2008 |
| JP | 2008-526118 A | 7/2008 |
| JP | 2008-527795 A | 7/2008 |
| JP | 2009-514439 A | 4/2009 |
| WO | WO 2006/071187 A2 | 7/2006 |
| WO | WO 2006/071760 A1 | 7/2006 |
| WO | WO 2007/051130 A2 | 5/2007 |

OTHER PUBLICATIONS

Written Opinion and International Search Report dated Nov. 27, 2009 in connection with PCT Application No. PCT/KR2009/001784.
Translation of Office Action dated Jan. 10, 2012 in connection with Japanese Patent Application No. 2010-550610.

* cited by examiner

*Primary Examiner* — Ajay Bhatia
*Assistant Examiner* — Dipakkumar Gandhi

(57) ABSTRACT

A system and method for relaying data communications in a Hybrid Automatic Repeat Request (HARQ) network. The system and method operable to receive a data communication packet from a base station during a first transmission time interval and simultaneously receive an acknowledgement signal from a subscriber station; and transmit a data communication packet to a subscriber station during a second transmission time interval and simultaneously transmit an acknowledgement signal to a base station.

39 Claims, 18 Drawing Sheets

(a) RS NAK THE 1ST TTI (b) RS ACK THE 1ST TTI

METHODS AND APPARATUS TO IMPROVE COMMUNICATION IN A RELAY CHANNEL

CROSS-REFERENCE TO RELATED APPLICATION(S) AND CLAIM OF PRIORITY

The present application is related to U.S. Provisional Patent No. 61/064,988, filed Apr. 7, 2008, entitled "METHODS AND APPARATUS TO IMPROVE COMMUNICATION IN A RELAY CHANNEL" and U.S. Provisional Patent No. 61/071,048, filed Apr. 9, 2008, entitled "METHODS AND APPARATUS TO IMPROVE COMMUNICATION IN A RELAY CHANNEL". Provisional Patent Nos. 61/064,988 and 61/071,048 are assigned to the assignee of the present application and is hereby incorporated by reference into the present application as if fully set forth herein. The present application hereby claims priority under 35 U.S.C. §119(e) to U.S. Provisional Patent Nos. 61/064,988 and 61/071,048.

TECHNICAL FIELD OF THE INVENTION

The present application relates generally to wireless communications networks and, more specifically, to relaying signals in a wireless communication network.

BACKGROUND OF THE INVENTION

Relay stations (hereinafter "RS") are added to wireless communication networks to increase the coverage range, user data rates, or both, at the periphery of the cellular coverage area. A multi-hop network facilities communication occurs between a base station (hereinafter "BS") and subscriber stations (also referred to as mobile stations, "MS") in the extended coverage area provided by a relay station. In a multi-hop network, a signal from a source may reach its destination in multiple hops through the use of the Relay stations. Relay stations typically boost the downlink (base station to the subscriber station) and uplink (subscriber station to the base station) signals regardless of whether the relay station is a fixed relay station (hereinafter "RS") or a mobile relay station. Current systems fail to effectively increase relay system coverage while employing power saving mechanisms for the relay station. Moreover, no procedures are currently available for effectively managing load conditions, such as the number of received and transmitted data and acknowledgment packets.

In MIMO systems, each of a plurality of data streams is individually encoded and modulated before being transmitted by different physical antennas or effective antennas. The combined data streams are then received at multiple antennas of a receiver. At the receiver, each data stream is separated and extracted from the combined signal. This process is generally performed using a minimum mean squared error (MMSE) or MMSE-successive interference cancellation (SIC) algorithm.

The MMSE-SIC algorithm detects signal components or data streams one at a time by repeatedly applying the MMSE algorithm. After one signal component is extracted, the data stream passes through a virtual channel for that data stream and is then subtracted or cancelled from the combined signal. Therefore, for each subsequent application of MMSE, the dimension of the underlying system is reduced by one. This process is called successive interference cancellation since each detected data stream acts as interference for the detection of the remaining data streams.

The order in which the successive interference cancellation is performed on the data streams has an enormous impact on the performance of MMSE-SIC. However, in typical MIMO systems, the order is randomly determined or pre-determined without regard for the actual system conditions. As a result, a stream that is inaccurately decoded and then reconstructed and canceled from the combined signal will introduce errors into the combined signal for the remaining data streams. One solution to this problem involves searching for all possible cancellation orders by verifying the accuracy of the decoded data streams before reconstruction and cancellation. However, because searching for all possible cancellation orders requires a large number of decoding attempts, this approach results in an extremely complex receiver.

Therefore, there is a need in the art for an improved relay station. In particular, there is a need for a system to more effectively and efficiently manage and decode data packets in a multi-hop network.

SUMMARY OF THE INVENTION

A relay station capable of simultaneously transmitting and receiving is provided. The relay station comprises a number of transmitters and receivers operable to transmit and received a plurality of data packets to and from a plurality of users, and a number of processors for prioritizing transmissions and receptions of data packets from and to each of a base station and a subscriber station.

A method for simultaneous communications in a Hybrid Automatic Repeat Request ("HARQ") is provided. The method comprising receiving by a relay station, during a first transmission time interval, a first data packet from a base station; receiving, by the relay station, during the first transmission time interval, a first acknowledgment message from a subscriber station, and transmitting, by the relay station, a second acknowledgement signal, during a second transmission time interval, to the base station; and transmitting, by the relay station, during the second transmission time interval, a second data packet to the subscriber station.

A method for synchronized data communications in a relay Hybrid Automatic Repeat Request ("HARQ") is provided. The method comprises transmitting a first data packet from a base station to at least one of a relay station and a subscriber station; transmitting a second data packet from a base station to the one of the relay station and the subscriber station prior to receiving a first acknowledgement message from the one of the relay station and the subscriber station; and transmitting the first acknowledgment message from the one of the relay station and the subscriber station to the base station.

A method for relaying data packets in a relay HARQ is provided. The method comprises transmitting, by a base station during a first transmission time interval, a first version of a data packet to at least one of a relay station and a subscriber station; and transmitting, by the relay station, a second version of the data packet to the subscriber station. The method further comprises transmitting, by the relay station, the second version of the data packet to the subscriber station in response to receiving a negative acknowledgement signal from the subscriber station.

A method for relaying data packets in a relay HARQ is provided. The method comprises transmitting, by a base station during a first transmission time interval, a first version of a data packet to at least one of a relay station and a subscriber station; and transmitting, by the base station, a second version of the data packet to at least one of the relay station and the subscriber station. The method further comprises, transmitting, by the base station, and the second version of the data packet to the subscriber station in response to receiving a negative acknowledgement signal from at least one of the relay station and the subscriber station.

A method for relaying data packets in a relay HARQ is provided. The method comprises transmitting, by a base station during a first transmission time interval, a data signal to at least one of a relay station and a subscriber station, the data signal comprising at least a first codeword and a second codeword; transmitting, by the relay station, the first codeword to the subscriber station in response to a negative acknowledgment signal received from the subscriber station; decoding by the subscriber station the first codeword transmitted by the relay station; and using the decoded first codeword to decode the second codeword. The method further comprises the relay station communicating a resource allocation request indicating a resource to be utilized to transmit the first codeword to the subscriber station.

A method for relaying data packets in a relay HARQ is provided. The method comprises transmitting, by a base station during a first transmission time interval, a data signal to at least one of a relay station and a subscriber station, the data signal comprising at least a first codeword and a second codeword; transmitting, by the relay station, the first codeword to the subscriber station in response to a negative acknowledgment signal received from the subscriber station; transmitting, by the base station, a third codeword in response to receiving the negative acknowledgment signal from the scriber station; and decoding by the subscriber station at least one of the first codeword transmitted by the relay station and the third codeword transmitted by the base station; and using the decoded first or third codeword to decode the third or first codeword respectively. The method further comprises using the decoded first word to decode the second codeword.

A method for relaying data packets in a relay HARQ is provided. The method comprises transmitting, by a base station during a first transmission time interval, a data signal to at least one of a relay station and a subscriber station, the data signal comprising at least a first codeword and a second codeword; transmitting, by the relay station, the first codeword to the subscriber station in response to a negative acknowledgment signal received from the subscriber station; retransmitting, by the base station, the first codeword in response to receiving the negative acknowledgment signal from the scriber station; and decoding by the subscriber station the first codeword; and using the decoded first codeword to decode the second codeword. The method further comprises the base station coordinating a preceding with the relay station prior to retransmission of the first codeword.

A method for relaying data packets in a relay HARQ is provided. The method comprises transmitting, by a base station during a first transmission time interval, a data signal to at least one of a relay station and a subscriber station, the data signal comprising at least a first codeword and a second codeword; transmitting, by the relay station, the first codeword to the subscriber station in response to a negative acknowledgment signal received from the subscriber station; transmitting, by the base station, a third codeword in response to receiving the negative acknowledgment signal from the scriber station; and soft combining the first codeword transmitted by the base station with the first codeword transmitted by the relay station; decoding, by the subscriber station, the first codeword; and using the decoded first codeword to decode the third and second codewords respectively.

To address the above-discussed deficiencies of the prior art, it is a primary object to provide a relay station capable of simultaneously transmitting and receiving for use in a wireless communication network.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication network.

Figure 1:
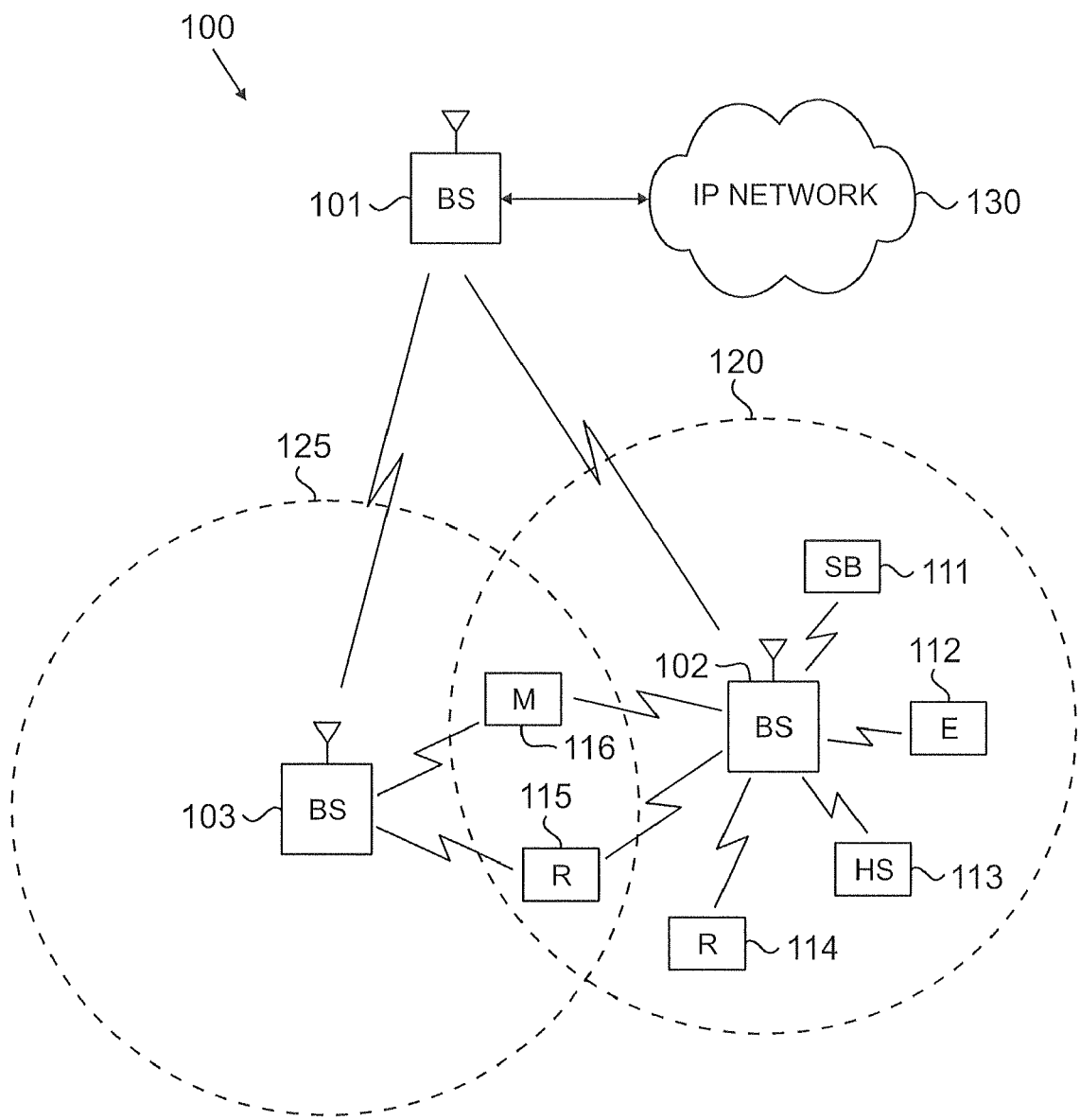
FIG. 1 illustrates an Orthogonal Frequency Division Multiple Access (OFDMA) wireless network that is capable of decoding data streams according to one embodiment of the present disclosure.

FIG. 1 illustrates exemplary wireless network 100 that is capable of decoding data streams according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber station (SS) may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in handoff mode, as known to those of skill in the art.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG.

1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

In accordance with an embodiment of the present disclosure, one or more of base stations 101-103 and/or one or more of subscriber stations 111-116 comprises a receiver that is operable to decode a plurality of data streams received as a combined data stream from a plurality of transmit antennas using an MMSE-SIC algorithm. As described in more detail below, the receiver is operable to determine a decoding order for the data streams based on a decoding prediction metric for each data stream that is calculated based on a strength-related characteristic of the data stream. Thus, in general, the receiver is able to decode the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

Figure 2:
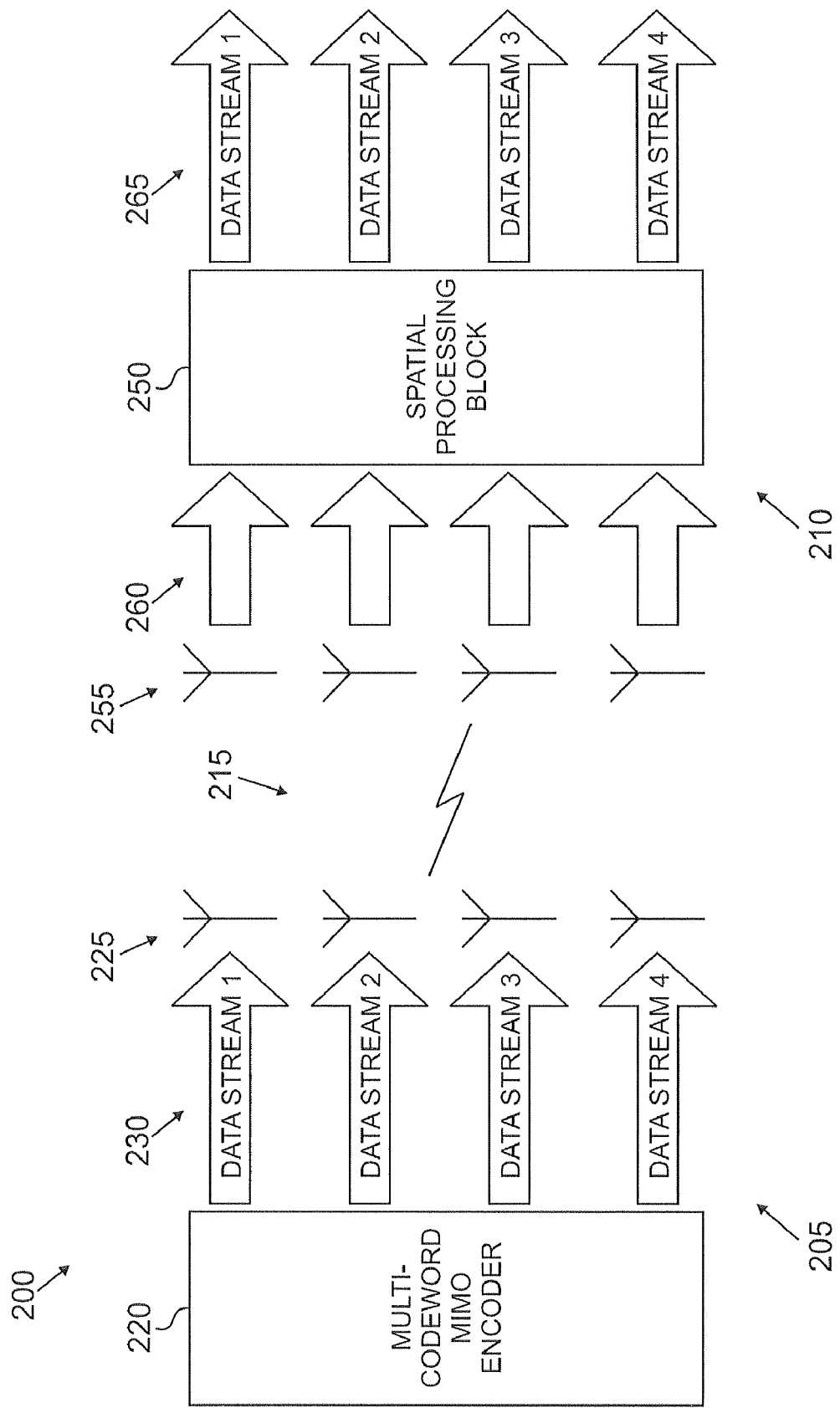
FIG. 2 illustrates a Multi Input Multi Output (MIMO) system that is capable of decoding data streams according to one embodiment of the present disclosure.

FIG. 2 illustrates a MIMO system 200 that is capable of decoding data streams according to an embodiment of the present disclosure. MIMO system 200 comprises a transmitter 205 and a receiver 210 that are operable to communicate over a wireless interface 215.

Transmitter 205 comprises a multi-codeword MIMO encoder 220 and a plurality of antennas 225, each of which is operable to transmit a different data stream 230 generated by encoder 220. Receiver 210 comprises a spatial processing block 250 and a plurality of antennas 255, each of which is operable to receive a combined data stream 260 from a plurality of sources including antennas 225 of transmitter 205. Spatial processing block 250 is operable to decode the combined data stream 260 into data streams 265, which are substantially identical to the data streams 230 transmitted by antennas 225.

Spatial processing block 250 is operable to decode data streams 265 from the combined data stream 260 using an MMSE-SIC procedure that selects an order for decoding the streams 265 based on a decoding prediction metric (DPM) for each stream 265. The DPM for each data stream 265 is based on a strength-related characteristic associated with the data stream 265. Thus, for example, the DPM may be based on a capacity of the channel associated with the data stream 265, an effective signal-to-interference and noise ratio (SINR) for the data stream 265 and/or any other suitable strength-related characteristic. Using this process for decoding, receiver 210 is able to provide better performance than a receiver that decodes streams in a random order without introducing the complexity of a receiver that searches all possible decoding orders to find an optimum decoding order.

Figure 3:
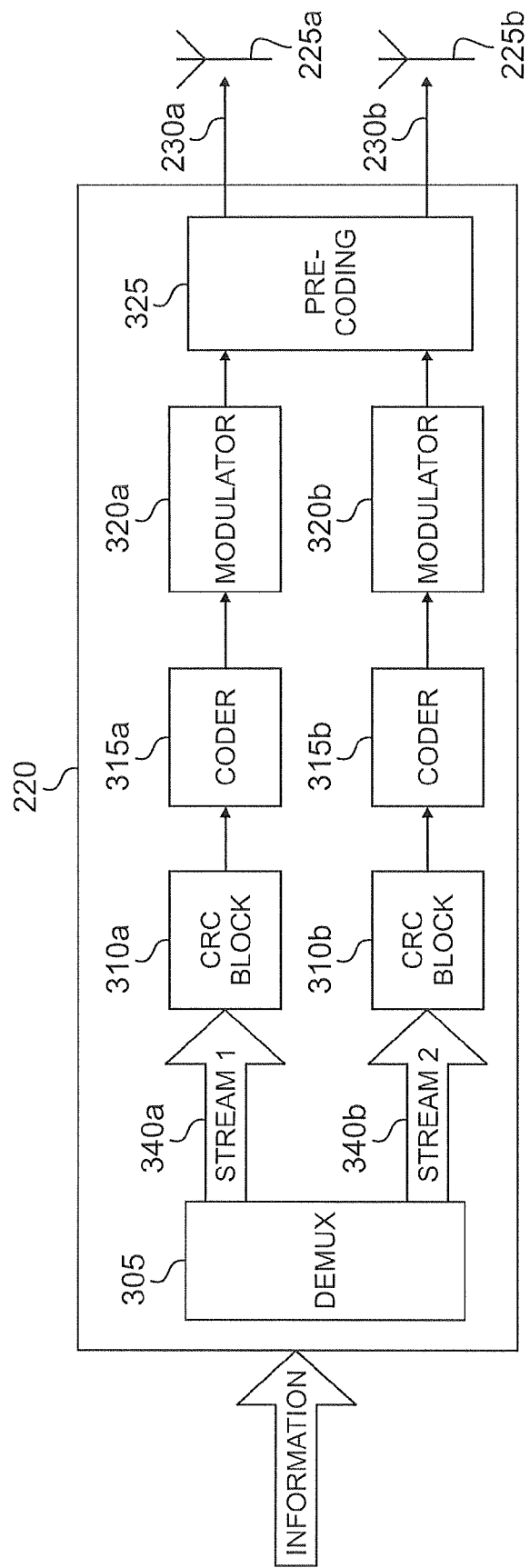
FIG. 3 illustrates details of the encoder of FIG. 2 according to one embodiment of the present disclosure.

FIG. 3 illustrates details of multi-codeword MIMO encoder 220 according to an embodiment of the present disclosure. For this embodiment, encoder 220 comprises a demultiplexer (demux) 305, a plurality of cyclic redundancy code (CRC) blocks 310, a plurality of coders 315, a plurality of modulators 320, and a pre-coder 325. Encoder 220 is operable to receive an information block and to generate data streams 230 based on the information block for transmission over antennas 225. Although the illustrated embodiment shows two sets of components 310, 315 and 320 to generate two streams 230a-b for transmission by two antennas 225a-b, it will be understood that encoder 220 may comprise any suitable number of component sets 310, 315, 320 and 325 based on any suitable number of streams 230 to be generated.

Demultiplexer 305 is operable to demultiplex the information block into a plurality of smaller information blocks, or streams 340. Each CRC block 310 is operable to add CRC data to the associated stream 340. Following the addition of CRC data, each coder 315 is operable to code the stream 340 and each modulator 320 is operable to modulate the coded stream 340. After coding and modulation, the resulting streams, which are equivalent to data streams 230, are processed through a preceding algorithm 325 and transmitted from separate antennas 225.

Because encoder 220 is a multi-codeword MIMO encoder, different modulation and coding may be used on each of the individual streams 340. Thus, for example, coder 315a may perform different coding from coder 315b and modulator 320a may perform different modulation from modulator 320b. Using multi-codeword transmission, a CRC check may optionally be performed on each of the codewords before the codeword is canceled form the overall signal at receiver 210. When this check is performed, interference propagation may be avoided in the cancellation process by ensuring that only correctly received codewords are canceled.

Precoding 325 is used for multi-layer beamforming in order to maximize the throughput performance of a multiple receive antenna system. The multiple streams of the signals are emitted from the transmit antennas with independent and appropriate weighting per each antenna such that the link through-put is maximized at the receiver output. Precoding algorithms for multi-codeword MIMO can be sub-divided into linear and nonlinear preceding types. Linear preceding approaches can achieve reasonable throughput performance with lower complexity relateved to nonlinear precoding approaches. Linear preceding includes unitary preceding and zero-forcing (hereinafter "ZF") preceding. Nonlinear precoding can achieve near optimal capacity at the expense of complexity. Nonlinear preceding is designed based on the concept of Dirty paper coding (hereinafter "DPC") which shows that any known interference at the transmitter can be subtracted without the penalty of radio resources if the optimal precoding scheme can be applied on the transmit signal.

Figure 4:
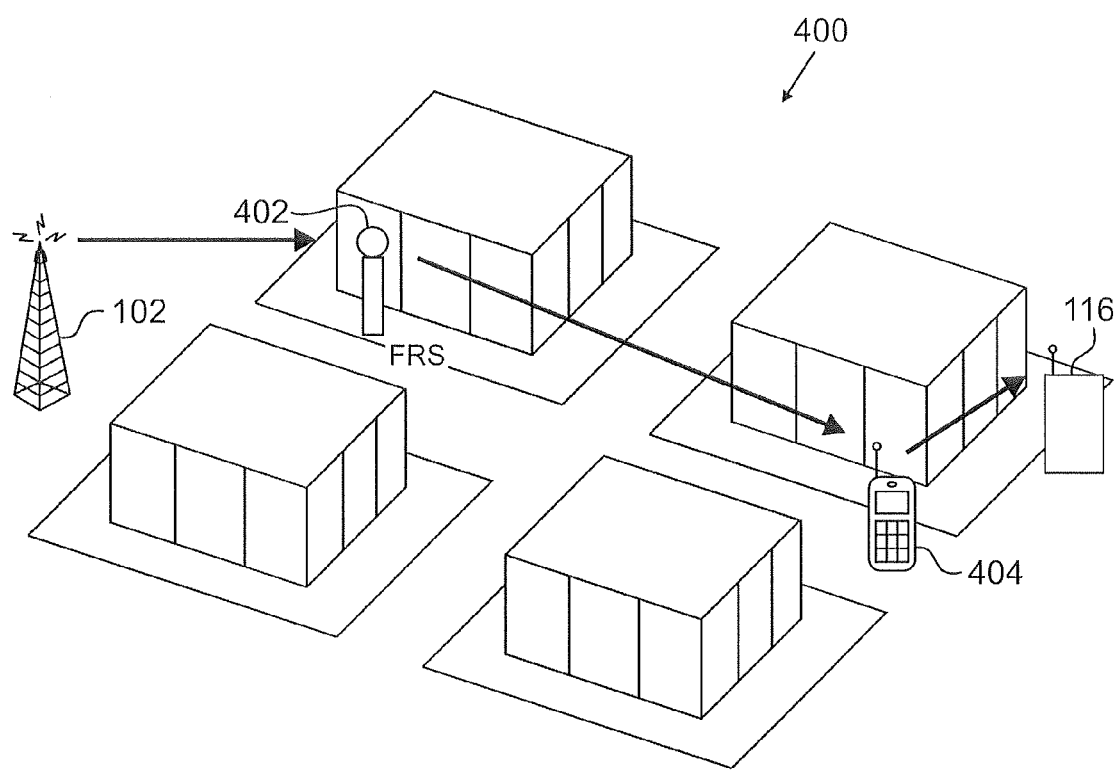
FIG. 4 illustrates a multi-hop cellular network according to one embodiment of the present disclosure.

FIG. 4 illustrates an exemplary multi-hop cellular network 400 according to an embodiment of the present disclosure. Multi-hop cellular network 400 preferably includes the use of, for example, a fixed relay station (RS) 402 and a mobile relay station (MRS) 404. Mobile relay station 404 may be a dedicated relay station or mobile relay station (MRS) 404 may be a subscriber station (SS) operable to act as a relay station (RS) 402. Multi-hop cellular network 400 forms a multi-hop link between a base station (BS) 102 and a subscriber station (SS) 116 served by BS 102. Multi-hop cellular network 400 extends the coverage range, user data rates and coverage area of a base station (BS) 102. Multi-hop cellular network 400 provides a method and procedure for coverage or range expansion, load control and balancing, and power savings for the relay station. In addition, RS 402 and MRS 404 may extend the coverage of a cellular network 400 by providing transmission and reception links for other subscriber stations (not shown) served by BS 102.

According to one embodiment of the present disclosure, RS 402 is hard-wired to the base station 102, while MRS 404 is preferably wirelessly connected to BS 102. Alternatively, RS 402 may be a nomadic relay station wirelessly connected to BS 102. Although the following primarily describes embodiments of the present disclosure in conjunction RS 402, it should be understood that other suitable relay stations, such as relay station MRS 404, may also be used.

The transmission power level of RS 404 is power controlled to keep the power level at a minimum while allowing communication with base stations. Thus, in accordance with one embodiment of the present disclosure, MRS 404 effectively reduces interference within the network and thus increases the capacity of cellular network 400. In one embodiment of the present disclosure, RS 402 generally includes two modes of operation.

Relaying can be performed in digital or analog manners. In the case of digital relaying, sometimes referred to as "regenerative relaying" or "decode and forward relaying," a RS 402 digitally decodes and re-encodes the relayed signal before retransmission.

Figure 5A:
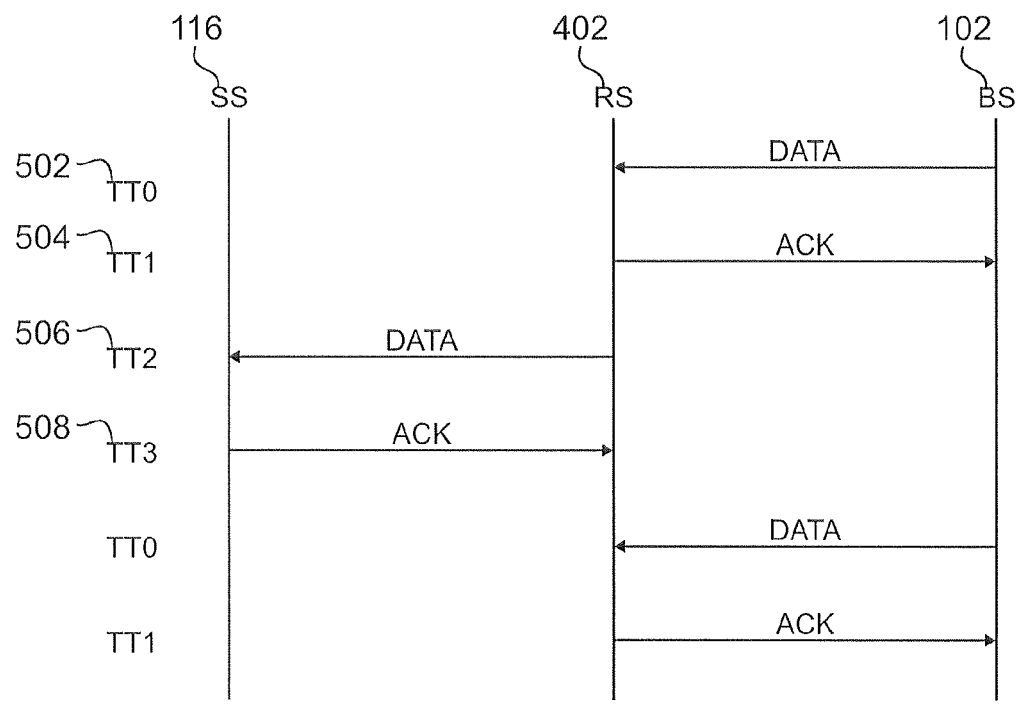
FIG. 5a illustrates data communications in a relay Hybrid Automatic Repeat Request (HARQ) according to one embodiment of the present disclosure.

Referring now to FIG. 5a, data communications in a relay Hybrid Automatic Repeat Request (HARQ) according to one embodiment of the present disclosure are illustrated. In a first transmission time interval TT0 502, BS 102 transmits a data packet over a downlink path to RS 402. The data packet comprises a plurality of data bits assembled as a communication packet. The plurality of data bits can be encoded as a codeword and transmitted as the communication packet.

When RS 402 receives the data packet, RS 402 decodes the packet. If RS 402 successfully decodes the data packet, RS 402 generates and transmits an ACK message to BS 102 along an uplink path. The ACK message is sent in a transmission time interval TT1 504. TT1 504 represents an instance in HARQ subsequent to TT0 502. However, illustration of TT1 504 as the time interval immediately subsequent to TT0 502 is exemplary and it should be understood that TT1 504 may occur at any transmission time interval subsequent to TT0 502. The ACK message is a control signal representing and acknowledgement that the data packet was received and successfully decoded. If RS 402 is unable to decode the data packet, RS 402 sends a NAK message (not illustrated) to BS 102 during TT1 504. The NAK is a control signal representing a negative acknowledgement. The NAK indicates that RS 402 was unable to decode the received data packet.

In a transmission time interval TT2 506, occurring after RS 402 sends the ACK message to BS 102, RS 402 decodes and forwards the data packet 506 to SS 116 along the downlink path. TT2 506 represents an instance in HARQ subsequent to TT1 504. Illustration of TT2 506 as the time interval immediately subsequent to TT1 504 is exemplary and it should be understood that TT2 506 may occur at any transmission time interval subsequent to TT1 504. SS 116 attempts to decode the packet when received from RS 402. If SS 116 successfully decodes the data packet, SS 116 generates and transmits an ACK message to RS 402 via the uplink path. SS 116 transmits the ACK message in a transmission time interval TTl3 508. TT3 508 represents an instance in HARQ subsequent to TT2 506. Illustration of TT3 508 as the time interval immediately subsequent to TT2 506 is exemplary and it should be understood that TT3 508 may occur at any time interval subsequent to TT2 508. Alternatively, if SS 116 is unable to decode the message, SS 116 transmits a NAK message (not illustrated) to RS 402 during TT13 508.

It would be understood that illustration of data communications among one base station to one relay station terminating at one subscriber station is exemplary only and networks with multiple hops via multiple relay stations and multiple subscriber stations may readily be incorporated. Additionally, the illustration of downlink communications (data transmitted from BS 102 to RS 402 and RS 402 to SS 116) also is exemplary. Embodiments for uplink communications (data transmitted from SS 166 to RS 402 and RS 402 to BS 102) are equally well within the scope of the present disclosure.

Figure 5C:
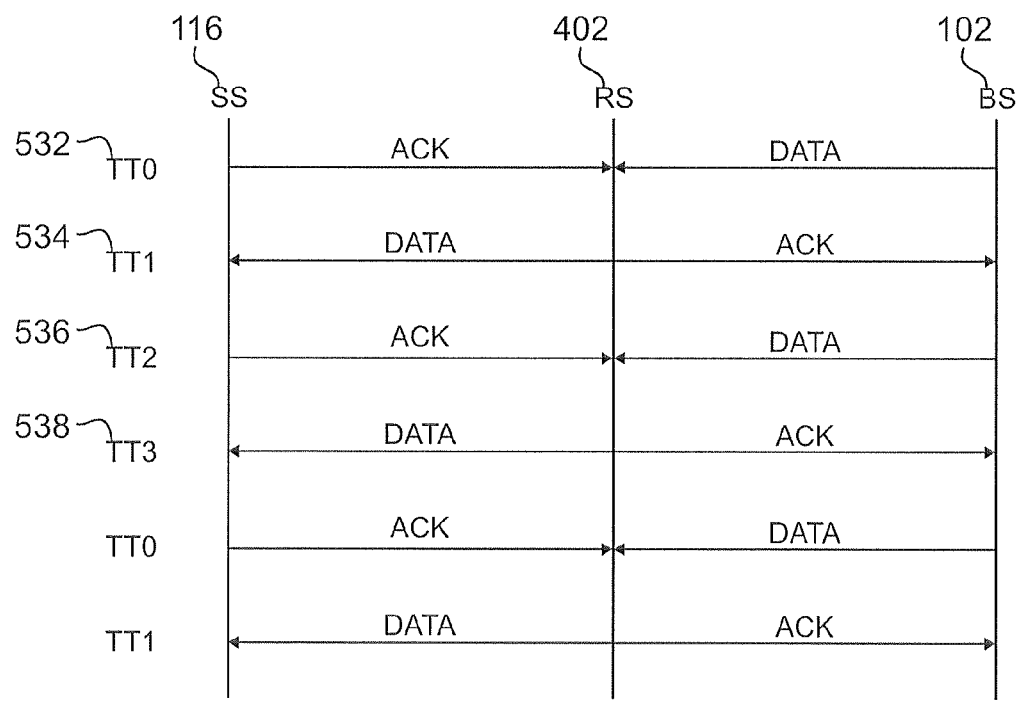
FIG. 5c illustrates a simple diagram for synchronized data communications in a relay Hybrid Automatic Repeat Request (HARQ) according to one embodiment of the present disclosure.
Figure 5B:
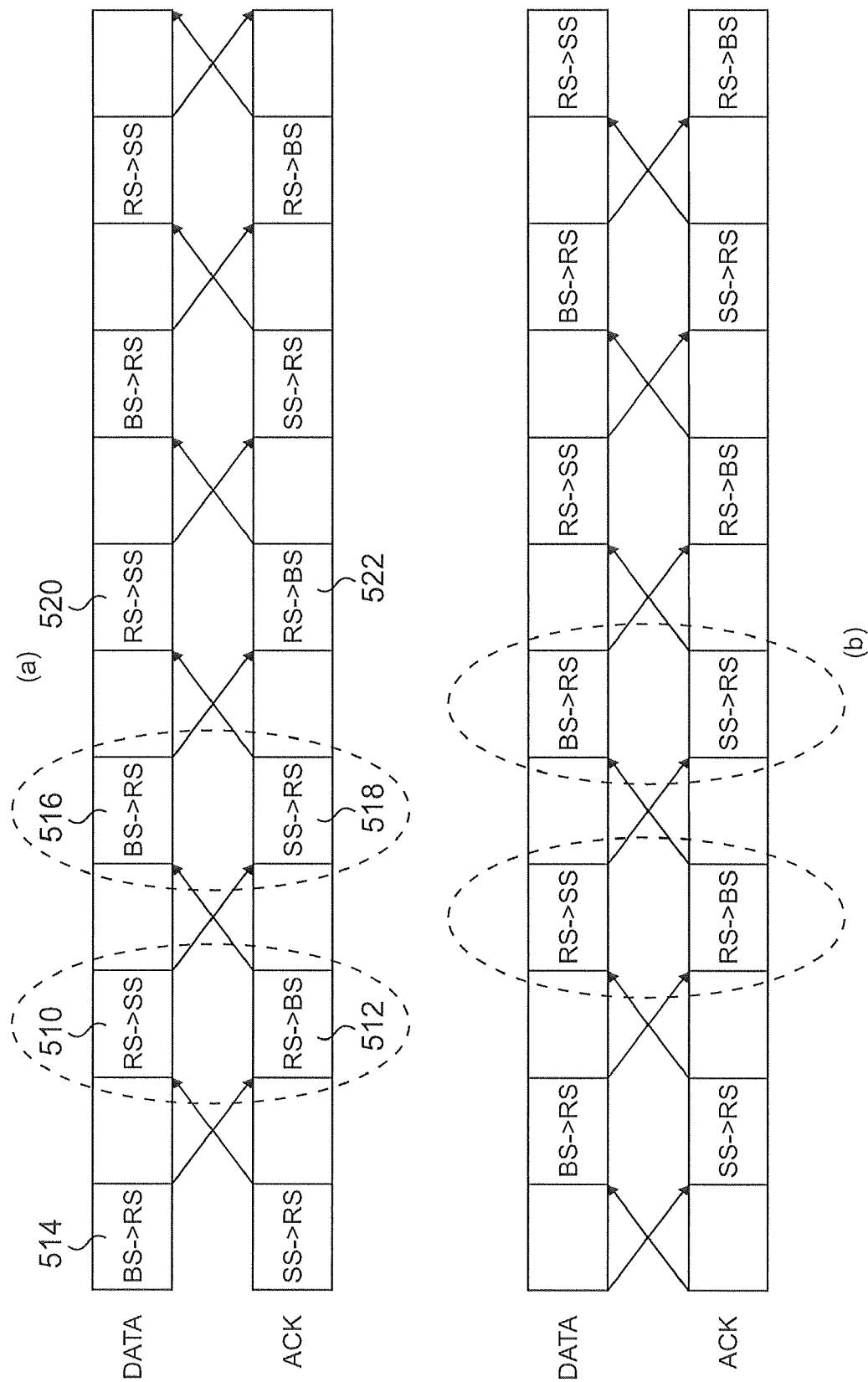
FIG. 5b illustrates a simple time diagram for a synchronized relay Hybrid Automatic Repeat Request (HARQ) according to one embodiment of the present disclosure.

Referring now to FIG. 5b, a synchronized relay Hybrid Automatic Repeat Request (HARQ) according to one embodiment of the present disclosure is illustrated. Downlink data transmissions are illustrated where data packets that originate at a first communication node, such as BS 102; are transmitted to a second communication node, such as RS 402; and forwarded to a third communication node, such as SS 116. Each transmission time interval (TTI) may be a subframe as in 3GPP LTE or IEEE 802.16m systems. During a third transmission time interval, RS 402 transmits a second data packet 510 to SS 116. Additionally during the third transmission time interval, RS 402 generates and transmits an ACK message 512 to BS 102. The ACK message 512 is a control signal that represents an acknowledgement of a first data packet received by RS 402 from BS 102. BS 102 previously transmitted the first data packet 514 during the first transmission time interval. The second data packet 510, transmitted from RS 402 to SS 116 in the third transmission time interval, may be the first data packet 514 that was transmitted from BS 102 to RS 402 in the first transmission time interval or the second data packet 514 may be a data packet transmitted from BS 102 to RS 402 at a transmission time interval prior to the first transmission time interval. RS 402 may have a buffer that stores the data packets for retransmission during a subsequent transmission time interval slotted for a RS 402 to SS 116 transmission. As such, during the third transmission time interval, RS 402 simultaneously transmits the second data packet 510 to SS 116 and transmits the ACK 512 to BS 102.

Additionally, during a fifth transmission time interval, BS 102 transmits a third data packet 516 to RS 402. BS 102 transmits the third data packet 516 after receiving the ACK 512 from RS 402 signifying receipt of the first data packet 510. Also during the fifth transmission time interval, SS 116 generates and transmits an ACK message 518. By sending the ACK message 518, SS 116 acknowledges to RS 402 that the second data packet 510 was received and decoded by SS 116. Alternatively, SS 116 may send a NAK (not illustrated) to RS 402 to inform RS 402 that SS 116 was unable to decode the second data packet 510.

After receiving the ACK message 518 from SS 116, RS 402 transmits, in a seventh transmission time interval, a fourth data packet 520. The fourth data packet 520 may be the third data packet 516 previously sent to RS 402 by BS 102; the fourth data packet may be the first data packet 514 previously sent to RS 402 by BS 102; or the fourth data packet may be a data packet sent to RS 402 by BS 102 at another, prior, transmission time interval. Also during the seventh transmission time interval, RS 402 generates and transmits an ACK message 522 to BS 102. The ACK message 522 indicates that RS 402 received and decoded the third data message 516. Alternatively, RS 402 may generate and transmit a NAK (not illustrated) indicating that RS 402 failed to decode the third data message 516.

Referring now to FIG. 5c, synchronized data communications in a relay Hybrid Automatic Repeat Request (HARQ) for a relay station according to one embodiment of the present disclosure are illustrated. In a first transmission time interval TT0 532, BS 102 transmits a first data packet over a downlink path to RS 402. During the first transmission time interval TT0 532, SS 116 generates, and transmits to RS 402, an ACK message indicating successful receipt and decoding of a prior data packet received at a transmission time interval prior to TT0 532. As such, RS 402 receives, substantially simultaneously, a first data packet from BS 102 and an ACK message from SS 116.

When RS 402 receives the first data packet, RS 402 decodes the first data packet. If RS 402 successfully decodes the first data packet, RS 402 generates and transmits an ACK message to BS 102 along an uplink path. The ACK message is sent in a transmission time interval TT1 534. TT1 534 represents an instance in HARQ subsequent to TT0 532. However, illustration of TT1 534 as the time interval immediately subsequent to TT0 532 is exemplary and it should be understood that TT1 534 may occur at any transmission time interval subsequent to TT0 532. Alternatively, RS 402 may sends a NAK message (not illustrated) during TT1 534. Additionally during TT1 534, RS 402 transmits a second data packet to SS 116. The second data packet may be the same as the first data packet that RS 402 received from BS 102 during TT0 532 or the second data packet may be a different data packet received by RS 402 from BS 102 at a transmission time interval prior to TT0 532. RS 402 transmits the second data packet to SS 116 after having received the ACK from SS 116 during TT0 532. Alternatively, if a NAK had been received from SS 116 during TT0 532, RS 402 may resend the prior data packet that SS 116 was unable to decode. As such, during TT1 534, RS 402 transmits substantially simultaneously, a second data packet to SS 116 and an ACK to BS 102.

In a transmission time interval TT2 536, occurring after RS 402 sends the ACK message to BS 102 in TT1 534, BS 102 transmits a third data packet to RS 402. If RS 402 transmitted a NAK at TT1 534, the third data packet may be resend of the first data packet or a second version of the first data packet. At substantially the same time, SS 116 generates and transmits an ACK that RS 402 receives during TT2 536. The ACK received by RS 402 during TT2 536 indicates a successful receipt and decoding of the second data packet sent by RS 402 during TT1 534. Alternatively, SS 116 may have sent a NAK to RS 402 during TT2 536. As such, during TT2 536, RS 402 receives substantially simultaneously, a third data packet from BS 102 and an ACK from SS 116.

By enabling RS 402 to simultaneously transmit data (RS 402 to SS 116) and acknowledgements (RS 402 to BS 102), and simultaneously receive data (BS 102 to RS 402) and acknowledgements (SS 116 to RS 402), the duty cycle of RS 402 is maximized. Therefore, synchronizing the transmission of data (RS 402 to SS 116) and acknowledgements (RS 402 to BS 102), and the reception of data (BS 102 to RS 402) and acknowledgments (SS 116 to RS 402) may maximize the efficiency of the relay network 400. This type of HARQ operation is hereinafter referred to as a synchronized relay HARQ. It would be understood that although the time allocated for RS 402 to transmit or receive data and acknowledgements may appear to be equal in FIG. 5a, the time allocation may be adjusted to optimize system performance.

Figure 6A:
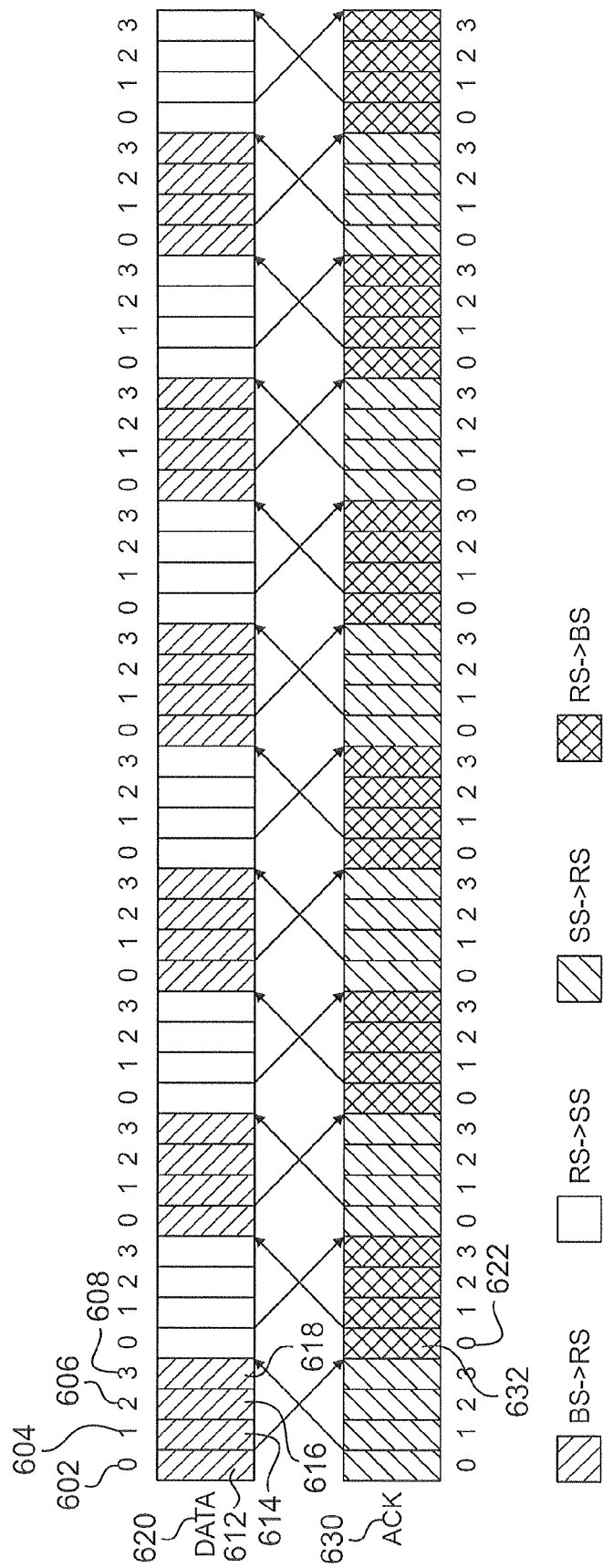
FIG. 6a illustrates a simple time diagram for an N-channel synchronized relay HARQ according to one embodiment of the present disclosure.
Figure 6B:
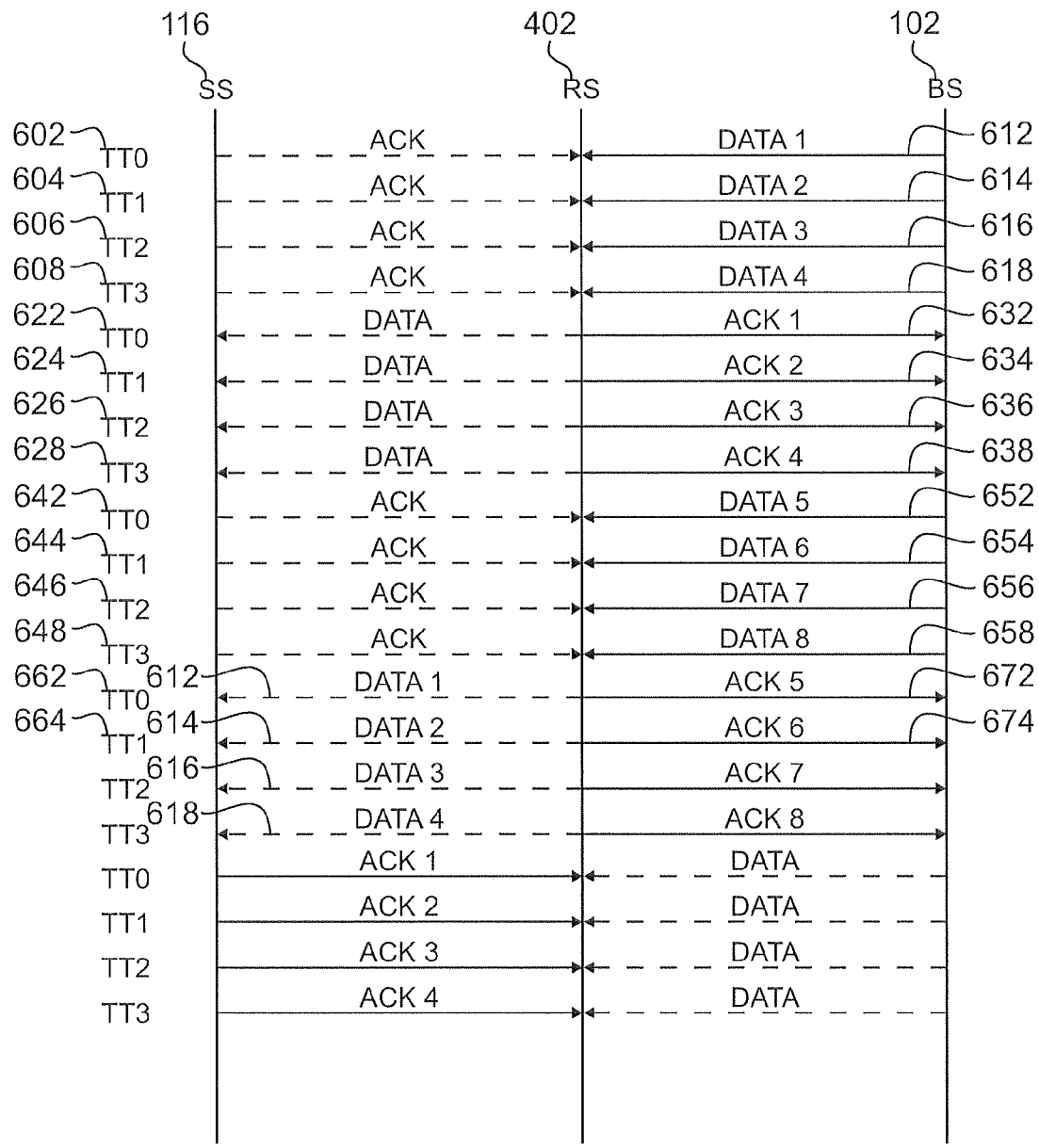
FIG. 6b illustrates a simple diagram for synchronized data communications in a relay HARQ according to one embodiment of the present disclosure.

In an alternate embodiment, multiple instances of synchronized relay HARQ are used to maximize the duty cycle of the communication nodes in a relay network. During a first transmission time interval, a first communication node transmits a first data packet to a second communication node. During a second transmission time interval, the first communication node transmits a second data packet to a third communication node while waiting for acknowledgement from the second communication node 630. In some embodiments, the second communication node 630 and the third communication node are the same node. Referring now to FIGS. 6a and 6b, BS 102 and RS 402 can generate and transmit data transmissions 620, RS 402 and SS 116 can generate acknowledgements (ACK or NaK) 630. BS 102 transmits a first data packet 612 to RS 402 at TTI0 602. At the same time instance, SS 116 may transmit an acknowledgement (ACK or NAK) to RS 402 to acknowledge a data packet received prior to TTI0 602. While waiting for RS 402 to acknowledge the first packet 612 (e.g. receiving either an ACK or NAK generated and transmitted by RS 402), BS 102 transmits the second data packet 614 to RS 402 at TTI1 604. At the same time instance, SS 116 may transmit another acknowledgement (ACK or NAK) to RS 402 to acknowledge a data packet received prior to TTI1 604. While still waiting for RS 402 to ACK the first data packet 612, BS 102 transmits a third data packet 616 during TTI2 606 and transmits a fourth data packet 618 during TT3 608. At the same time instances, SS 116 may transmit another acknowledgement (ACK or NAK) during TTI2 606 to acknowledge data packets received prior to TTI2 606 and yet another acknowledgement (ACK or NAK) during TTI3 608 to acknowledge data packets received prior to TTI 608. Thereafter, RS 402 generates and transmits ACK or NAK message 632 for the first data packet 612, during TTI0 622. At the same time instance, RS 402 generates and transmits a data packet to SS 116. The data packet may be the data packet RS 402 received from BS 102 during TTI0 602, or may be other data received by RS 402 prior to TTI0 622. Further, RS 402 will generate ACKs or NAKs, 634, 636 and 638, for the second, third and fourth data packets 614, 616, and 608 during TT1 624, TT2 626 and TT3 628 respectively. At these time instances, RS 402 may also generate and transmit data packets to SS 116.

FIGS. 6a and 6b illustrate four (4) HARQ instances. As such, four (4) data packets may be outstanding for RS 402 to receive from BS 102. Therefore, RS 402 is always transmitting or receiving data and acknowledgements, while BS 102 is either transmitting data or receiving acknowledgements, and SS 116 is either receiving data from RS 402 or transmitting acknowledgements to RS 402. Further, RS 402 is transmitting an ACK to BS 102 during the same instance that RS 402 is transmitting a data packet to SS 116. Additionally or alternatively, during another instance, RS 402 is receiving an ACK from SS 116 and receiving a data packet from BS 102. It would be understood that the illustration of only one RS 402 and one SS 116 is exemplary and embodiments of the present disclosure readily extend to a system with multiple RS 402 and multiple SS 116.

FIG. 6b illustrates exemplary data communications in a relay HARQ according to embodiments of the present disclosure. RS 402 receives data packets 612, 614, 616 and 618 from BS 102 during TTI0 602, TTI1 604, TTI2 606 and TTI3 608 respectively. Additionally, RS 402 receives a plurality of ACK/NAK messages from SS 116 regarding previously transmitted data packets. RS 402 generates and transmits ACK messages 632, 634, 636 and 638 to BS 102 during TTI0 622, TTI1 624, TTI2 626 and TTI3 628 respectively. RS 402 transmits the ACK messages 632, 634, 636 and 638 while simultaneously transmitting data packets to SS 116. In response to receiving ACK messages 632, 634, 636 and 638 from RS 402, BS 102 transmits data packets 652, 654, 656 and 658 during TTI0 642, TTI1 644, TTI2 646 and TTI3 648 respectively. If RS 402 transmitted one or more NAK messages during TTI0 622, TTI1 624, TTI2 626 and TTI3 628 respectively, BS 102 would retransmit a version of the data packet associated to the NAK received. For example, if RS 402 sends a NAK during TTI2 636 indicating a failure to decode the third data packet 616, the data packet 656 transmitted by BS 102 during TTI2 646 would a version of the third data packet 616 originally transmitted during TTI2 606. While simultaneously transmitting ACK/NAK message 672 to BS 102, RS 402 transmits the first data packet 612, originally received by RS 402 during TTI0 602, to SS 116 during TTI0 662. Additionally, RS 402 may retransmit a previous data packet in response to an ACK associated to the previous data packet received from SS 116. It would be understood that the illustration of BS 102 and RS 402 transmitting the version of a previous data packet in a transmission time interval instance immediately relative to the received NAK (e.g. BS 102 transmitting a version of the third data packet 616 during the third instance, TTI 2 646 in response to a NAK 636 received during the third instance, TTI2 626) is exemplary. BS 102 and RS 402 processors are operable to prioritize and schedule the data packets according to preset programming instructions. As such, higher priority data packets may be transmitted prior to the transmission of a second version of a previous data packet.

Figure 7A:
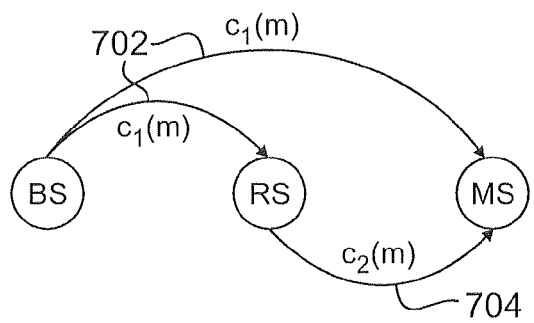
FIGS. 7a and 7c illustrate simple block diagrams of a incremental redundancy relay system according to embodiments of the present disclosure.
Figure 7C:
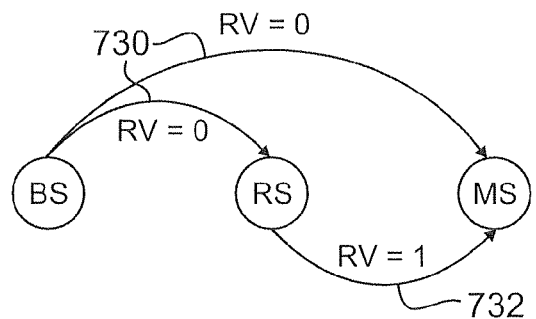
Figure 7B:
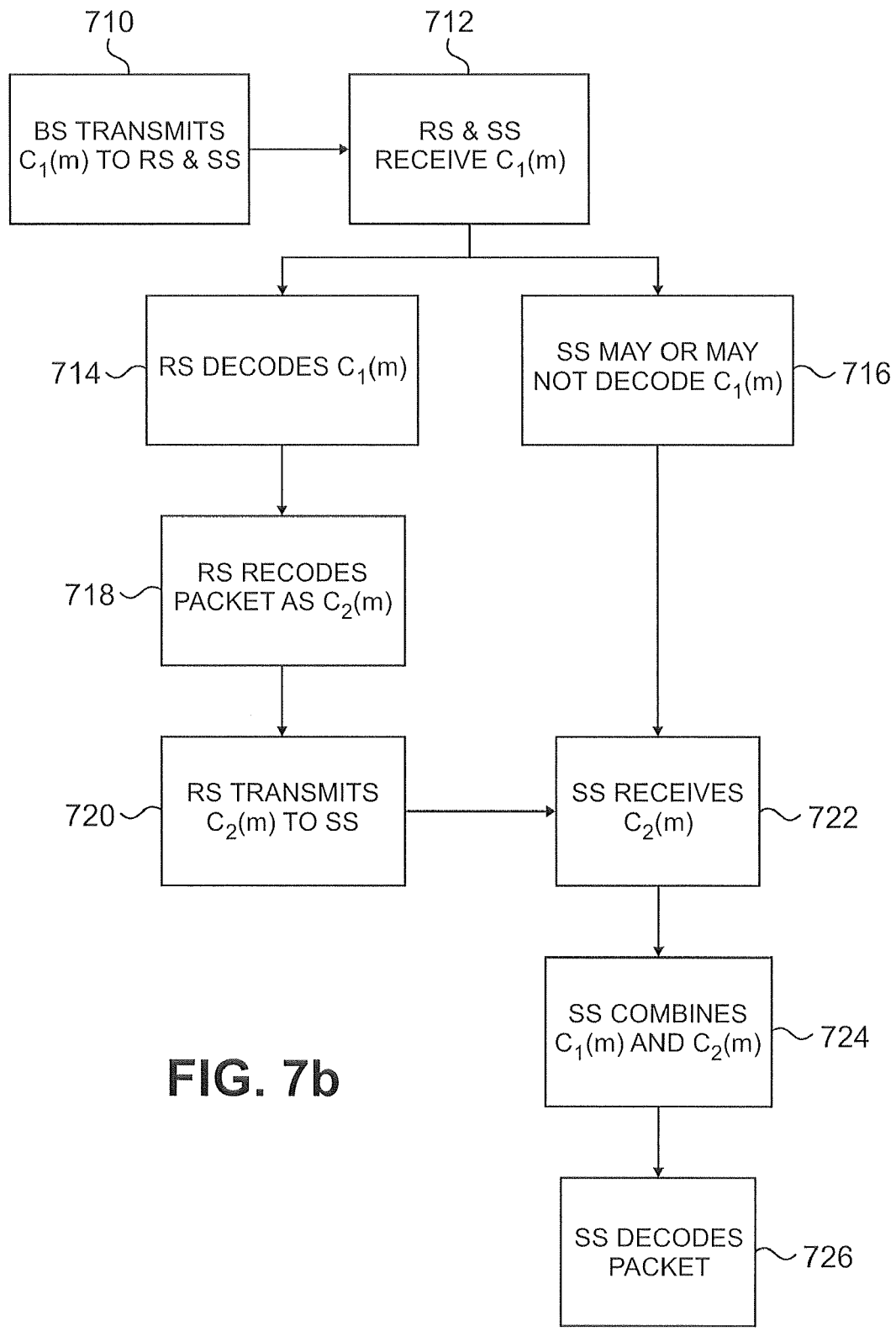
FIG. 7b illustrates a flow chart of an incremental redundancy relay system according to embodiments of the present disclosure are illustrated.

Referring now to FIGS. 7a and 7b, a simple block diagram and a flow chart of an incremental redundancy relay system according to embodiments of the present disclosure are illustrated. BS 102 is sending a data packet (m) to SS 116 in a synchronized relay HARQ network. In step 710, during a first transmission time interval, BS 102 transmits a first version of a data packet $c_1(m)$ 702. RS 402 and SS 116 each receive the transmission from BS 102 in step 712. RS 402 decodes the data packet $c_1(m)$ 702 in step 714. SS 116 may or may not decode the data packet $c_1(m)$ 702 in step 716. In step 718, RS 402 re-encodes the data packet (m) as a second version of the data packet $c_2(m)$ 704. RS 402 may use a different channel coding or same channel coding (e.g. a different redundancy version). During a second transmission time interval, RS 402 transmits the second version of the data packet $c_2(m)$ 704 in step 720. The second transmission time interval may have a different duration than the first transmission time interval. In step 722, SS 116 receives the second version of the data packet $c_2(m)$ 704. Thereafter in step 724, SS 116 combines the first version of the data packet $c_1(m)$ 702 and the second version of the data packet $c_2(m)$ 704 and decodes the data packet (m) in step 726. If the two versions of the data packets are different codewords, or different parts of the same codewords, combining of the two versions of the data packets at SS 116 reduces the effective code rate, which improves the decoding performance at SS 116.

In some embodiments, circular buffer rate matching is applied to the relay network 400. Circular Buffer Rate Matching (hereinafter "CBRM"), or Quasi-Complementary Turbo Codes (hereinafter "QCTC") are widely utilized in wireless communication systems, such as 3GPP LTE and 3GPP2 UMB. With CBRM procedures or QCTC, the transmitter starts from a position in a buffer of coded bits and select bits for transmission. The starting position is typically determined by a redundancy version (hereinafter "RV"), or sometimes a sub-packet ID, among other things. As such, a different version of a same packet will be transmitted, depending on the redundancy version or the sub-packet ID. Referring now to FIGS. 7a, 7b and 7c, BS 102 transmits the first version of the data packet "RV=0" 730. RS 402 and SS 116 each receive the first version of the data packet. RS 402 decodes first version the data packet and recodes the data packet as a second version of the data packet with an "RV=1". RS 402 transmits the second version of the data packet with and "RV=1" 732 to SS 116. Thereafter, SS 116 combines the first version of the data packet (RV=0) and the second version of the data packet (RV=2) and decodes the data packet.

Figure 8A:
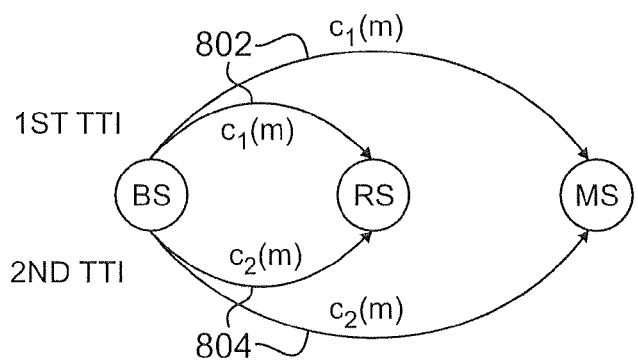
FIGS. 8a and 8b illustrates simple block diagrams of a incremental redundancy relay system according to embodiments of the present disclosure.
Figure 8B:
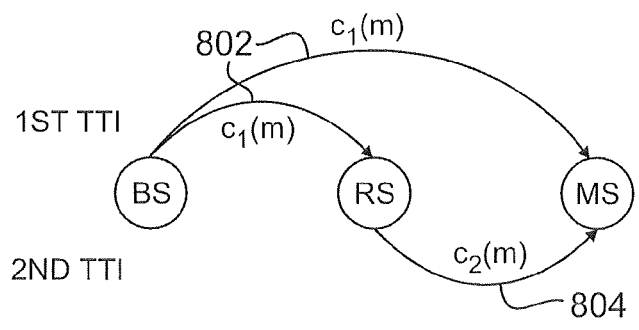
Figure 8C:
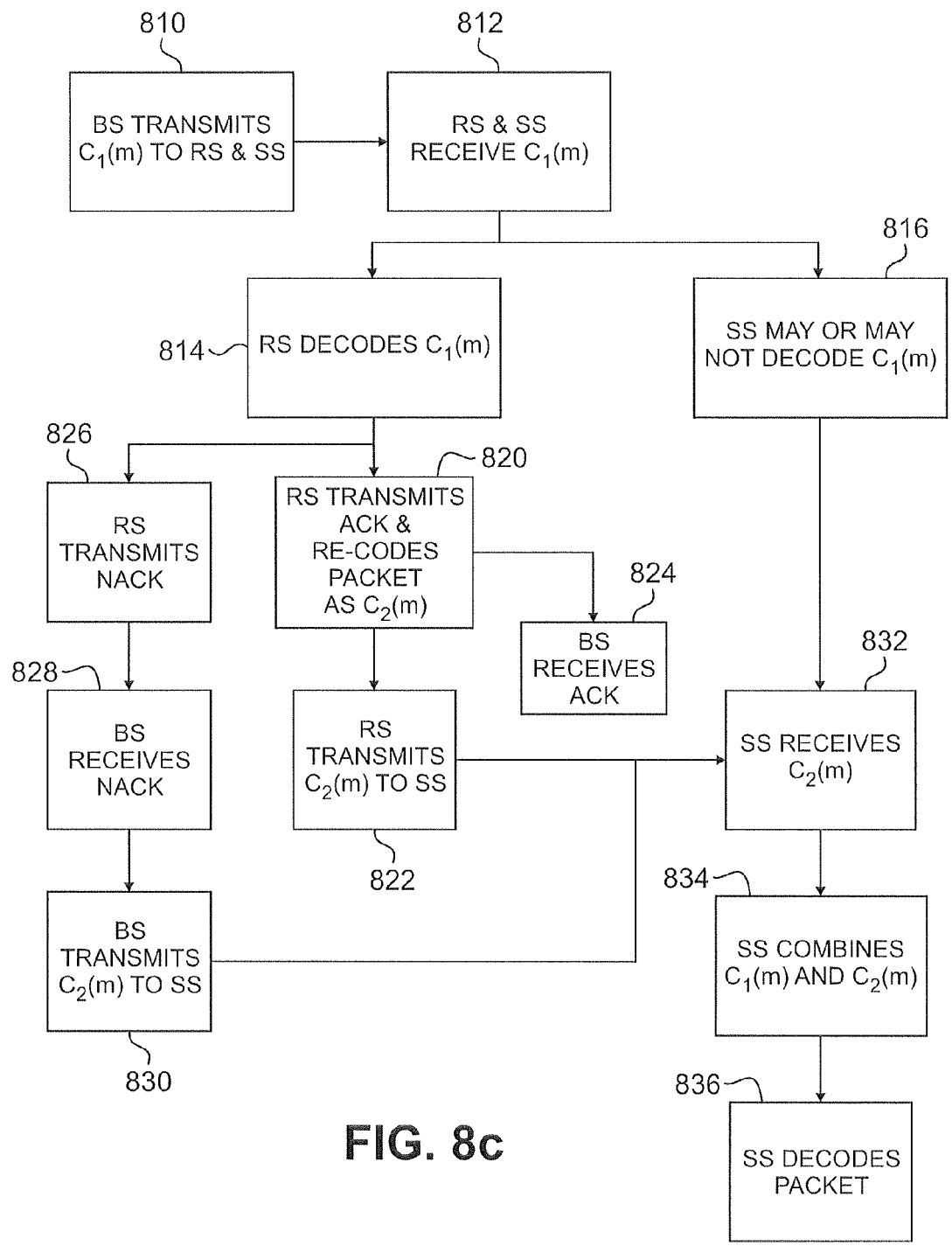
FIG. 8c illustrates a flow chart of an incremental redundancy relay system according to embodiments of the present disclosure.

In another embodiment illustrated in FIGS. 8a, 8b and 8c, either BS 102 or RS 402 transmits the second version of the data packet. At step 810, during a first transmission time interval, BS 102 transmits a first version of a data packet 802. RS 402 and SS 116 each receive the transmission from BS 102 in step 812. RS 402 decodes the first version of the data packet 802 in step 814. Step 816 illustrates that SS 116 may or may not decode the packet. If RS 402 correctly decodes the first version of the data packet 802, the process moves to step 820 where RS 402 generates and transmits an ACK message to BS 102. Further in step 820, RS 402 re-encodes the data packet as the second version of the data packet 804. Then, in step 822, RS 402 transmits the second version of the data packet 804 to SS 116 during the second transmission time interval. Since BS 102 receives the ACK from RS 402 in step 824, BS 102 does not attempt to resend any more versions of the data packet. However, if RS 402 was unable to correctly decode the first version of the data packet 802 in step 814, the process moves to step 826 where RS 402 generates and transmits a NAK message to BS 102. In step 828, BS 102 either receives the NAK or receives no response (e.g. no ACK from RS 402) after a specified period of time. Since BS 102 either receives the NAK indicating that RS 402 was unable to decode the first version of the data packet 802 or receives nothing indicating that RS 402 did not receive the first version of the data packet 802, BS 102 transmits the second version of the data packet 804 in the second transmission time interval in step 830. Thereafter, in step 832, SS 116 receives the second version of the data packet 802. SS 116 combines the first version of the data packet 802 and the second version of the data packet 804 in step 834 and decodes the data packet in step 836. Therefore, SS 116 receives the second version of the packet 804 regardless of whether or not RS 402 receives and decodes the first version of the packet 802. In still additional embodiments, SS 116 sends an ACK or NAK indicating receipt and decoding of the first version of the packet 802. If SS 116 successfully receives and decodes the first version of the data packet 802, SS 116 transmits an ACK message for the first version of the packet 802. In response to receiving the ACK message from SS 116, BS 102 and RS 402 do not send the second version of the packet 804. If SS 116 sends a NAK message or nothing at all, either BS 102 or RS 402 transmits the second version of the packet 804, depending on whether or not RS 402 received and decoded the first version of the packet 802.

Figure 9A:
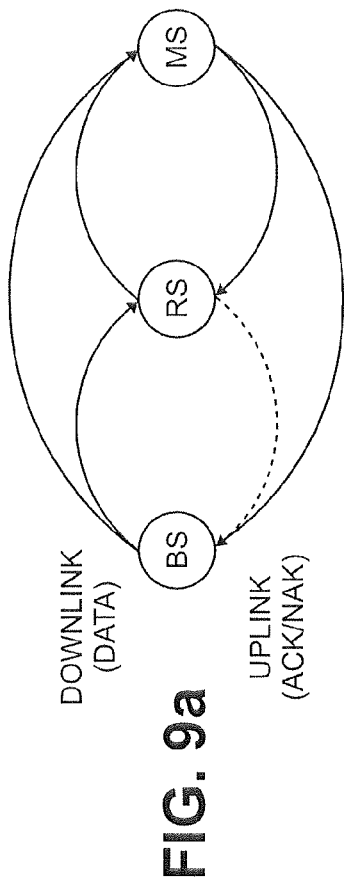
FIGS. 9a and 9b illustrate simple block diagrams of data communications in relay station assisted communication between a base station and a subscriber station according to one embodiment of the present disclosure.
Figure 9B:
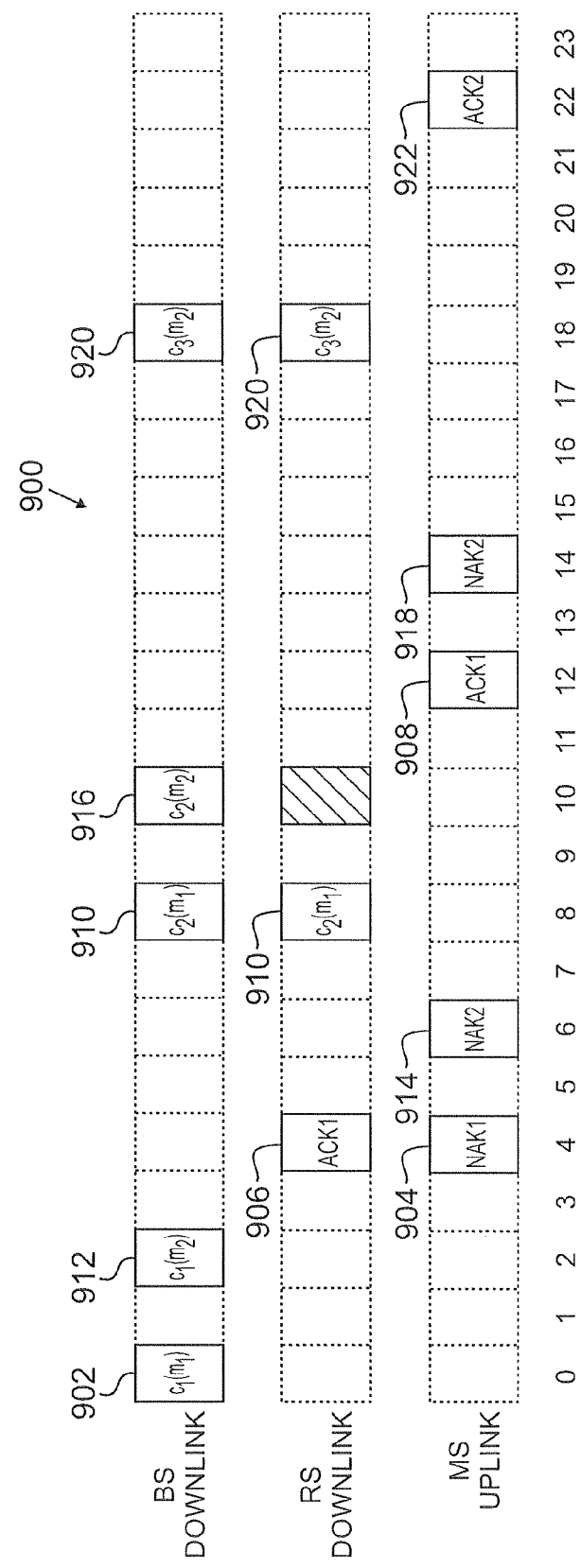

In another embodiment, illustrated by FIGS. 9a and 9b, the an eight-channel synchronous incremental redundancy HARQ 900 operates directly between BS 102 and SS 116, while RS 402 assists the communication. In TTI0, BS 102 transmits the first version of a first data packet, $c_1(m_1)$ 902. RS 402 and SS 116 each receive the first version of the first data packet, $c_1(m_1)$ 902. RS 402 decodes the first version of the first data packet, $c_1(m_1)$ 902 correctly but SS 116 fails to decode the first version of the first data packet, $c_1(m_1)$ 902. At TTI4, SS 116 transmits a NAK1 message 904. Also at TTI4, RS 402 transmits an ACK1 message 906. Both BS 102 and RS 402 receive the NAK1 message 904. At TTI 8, BS 102 transmits the second version of the first data packet $c_2(m_1)$ 910 to SS 116. Additionally, RS 402 transmits the second version of the first data packet $c_2(m_1)$ 910 to SS 116. SS 116 decodes the packet by combining the first version of the first data packet $c_1(m_1)$ 902 and the second version of the first data packet $c_2(m_1)$ 910. Then at TTI12, SS 116 transmits an ACK1 message 908 to acknowledge the first data packet $m_1$. Additionally, in TTI2, BS 102 transmits a first version of a second data packet $c_1(m_2)$ 912. Both RS 402 and SS 116 receive the first version of the second data packet $c_1(m_2)$ 912. RS 402 fails to decode the first version of the second data packet $c_1(m_2)$ 912 correctly. Additionally, SS 116 fails to decode the first version of the second data packet $c_1(m_2)$ 912 correctly. SS 116 transmits a NAK2 message 914 at TTI6. BS 102 receives the NAK2 message 914. At TTI10, BS 102 transmits a second version of the second data packet $c_2(m_2)$ 916. Since RS 402 did not correctly receive the first version of the second data packet $c_1(m_2)$ 912 that was transmitted at TTI2, RS 402 does not transmit any version of the second data packet, e.g. $c_2(m_2)$ 916, at TTI10. However, RS 402 receives the transmission of $c_2(m_2)$ 916 transmitted by BS 102 at TTI10. RS 402 then decodes the packet $m_2$. RS 402 may decode the packet $m_2$ by combining the second version of the second data packet $c_2(m_2)$ 916 with the previous transmissions from BS 102, e.g., the first version of the second data packet $c_1(m_2)$ 912. RS correctly decodes $c_2(m_2)$ 916 transmitted at TTI10. SS 116 again fails to decode $c_2(m_2)$ 916. SS 116 transmits another NAK2 message 918 at TTI14. Both BS 102 and RS 402 receive the NAK2 message 918. At TTI18, BS 102 transmits a third version of the second data packet $c_3(m_2)$ 920. Additionally, RS 402 transmits the third version of the second data packet $c_3(m_2)$ 920. SS 116 decodes the second data packet $m_2$ by combining all versions of the second data packet $m_2$ received, e.g. $c_1(m_2)$ 912, $c_2(m_2)$ 916 and $c_3(m_2)$ 920. After SS 116 correctly decodes the packet $m_2$, then at TTI22, SS 116 transmits an ACK2 message 922 to acknowledge packet $m_2$. Therefore, the HARQ operation is maintained between BS 102 and SS 116, while RS 402 contributes to the transmission only if RS 402 receives the data packet from BS 102. Further, this embodiment is applicable to FDD and TDD systems. Additionally, in some embodiments RS 402 transmits an ACK message signals to BS 102. Alternatively, in some embodiments RS 402 does not transmit ACK message signals BS 102.

Figure 10:
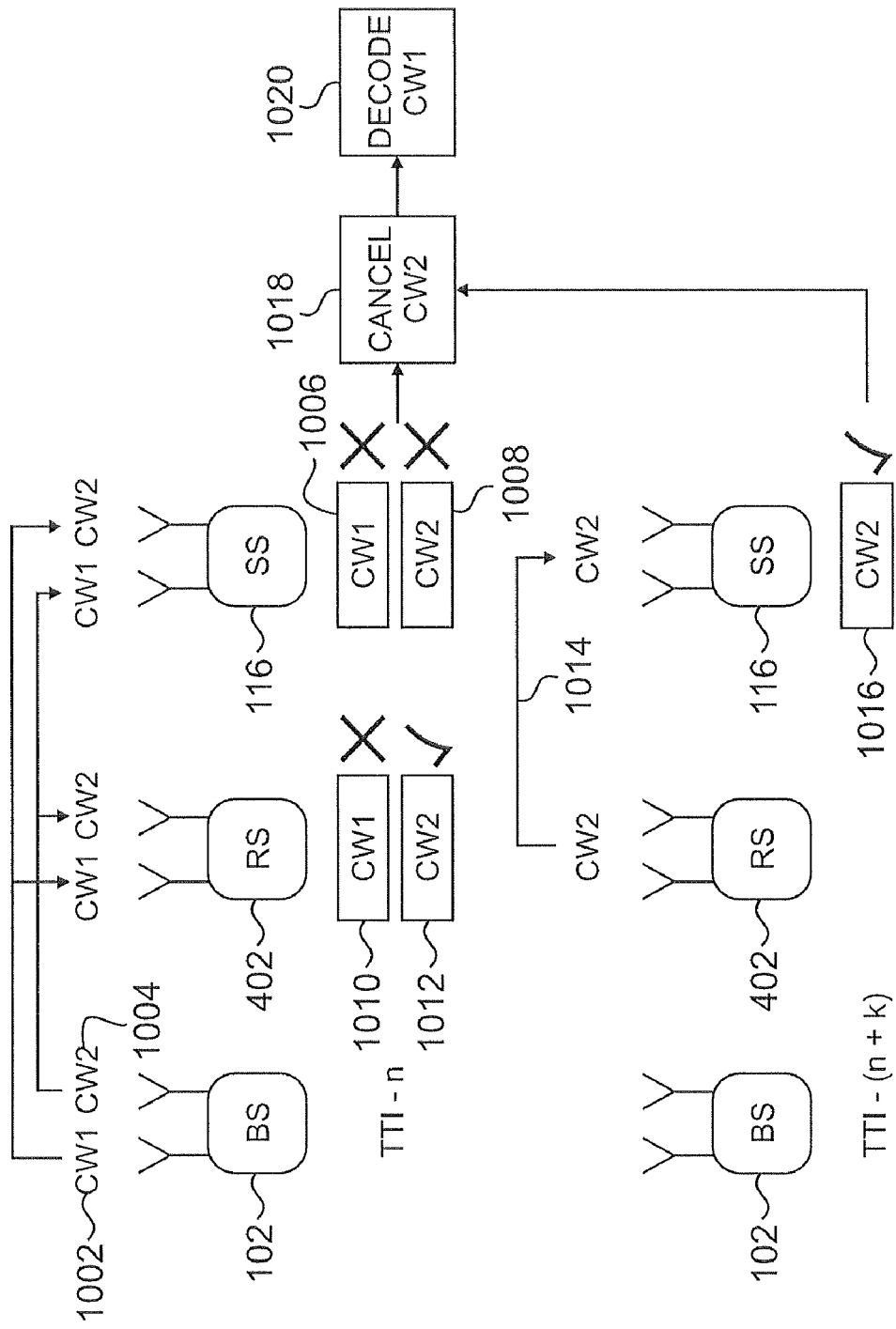
FIG. 10 illustrates RS-assisted communication between BS and SS using MCW MIMO according to one embodiment of the present disclosure.

In another embodiment, illustrated in FIG. 10, RS 402 assists BS 102 to SS 116 communication using multi-antenna MIMO hybrid ARQ. BS 102 transmits two codewords, CW1 1002 and CW2 1004 to SS 116 in a first transmission time interval ("TTI-n") over two MIMO layers. Each codeword is a data packet comprising a jointly encoded plurality of bits. Additionally and alternatively, the codeword may be transmitted over different antennas, e.g. via Spatial Division Medium Access (hereinafter "SDMA"). As such, the codewords may have a spatial separation and, therefore, interfere with each other. RS 402 receives CW1 1002 and CW2 1004. RS 402 attempts to decode CW1 1002 and CW2 1004. RS 402 successfully decodes 1012 CW2 1004 but does not successfully decode 1010 CW1 1002. SS 116 receives CW1 1002 and CW2 1004 in error (e.g. SS 116 is unable to decode 1006 CW1 1002 and unable to decode 1008 CW2 1004). SS 116 stores the received CW1 1002 and CW2 1004 signal in a buffer and sends NAKs for CW1 1002 and CW2 1004 to BS 102. RS 402 sends a NAK message signal for CW1 1002 and an ACK message signal for CW2 1004. RS 402 decodes the NAK signals from SS 116 and determines that SS 116 needs assistance decoding CW1 1002 and CW2 1004. RS 402 forwards (e.g. transmits) 1014 the correctly received codeword CW2 1004 to SS 116 in the next available TTI ("TTI-(n+k)"). RS 402 may transmit a different encoded version of the plurality of bits or the same encoded version of the plurality of bits. SS 116 successfully decodes 1016 CW2 1004. SS 116 re-encodes CW2 1004. Thereafter, SS 116 cancels 1018 CW2 1004 from the stored CW1 1002 and CW2 1004 signal (previously stored in the buffer) received in the first TTI ("TTI-n"). SS 116 is able to use interference cancellation by removing the interference caused by CW2 1004 from the CW1 1002 and CW2 1004 signal received from BS 102. Once the interference from CW2 1004 has been removed from the CW1 1002-CW2 1004 signal, SS 116 is able to decode 1020 CW1 1002. As such, RS 402 forwards only the codewords to SS 116 that are successfully received at RS 402 without requiring a retransmission of the codewords from BS 102.

Figure 11:
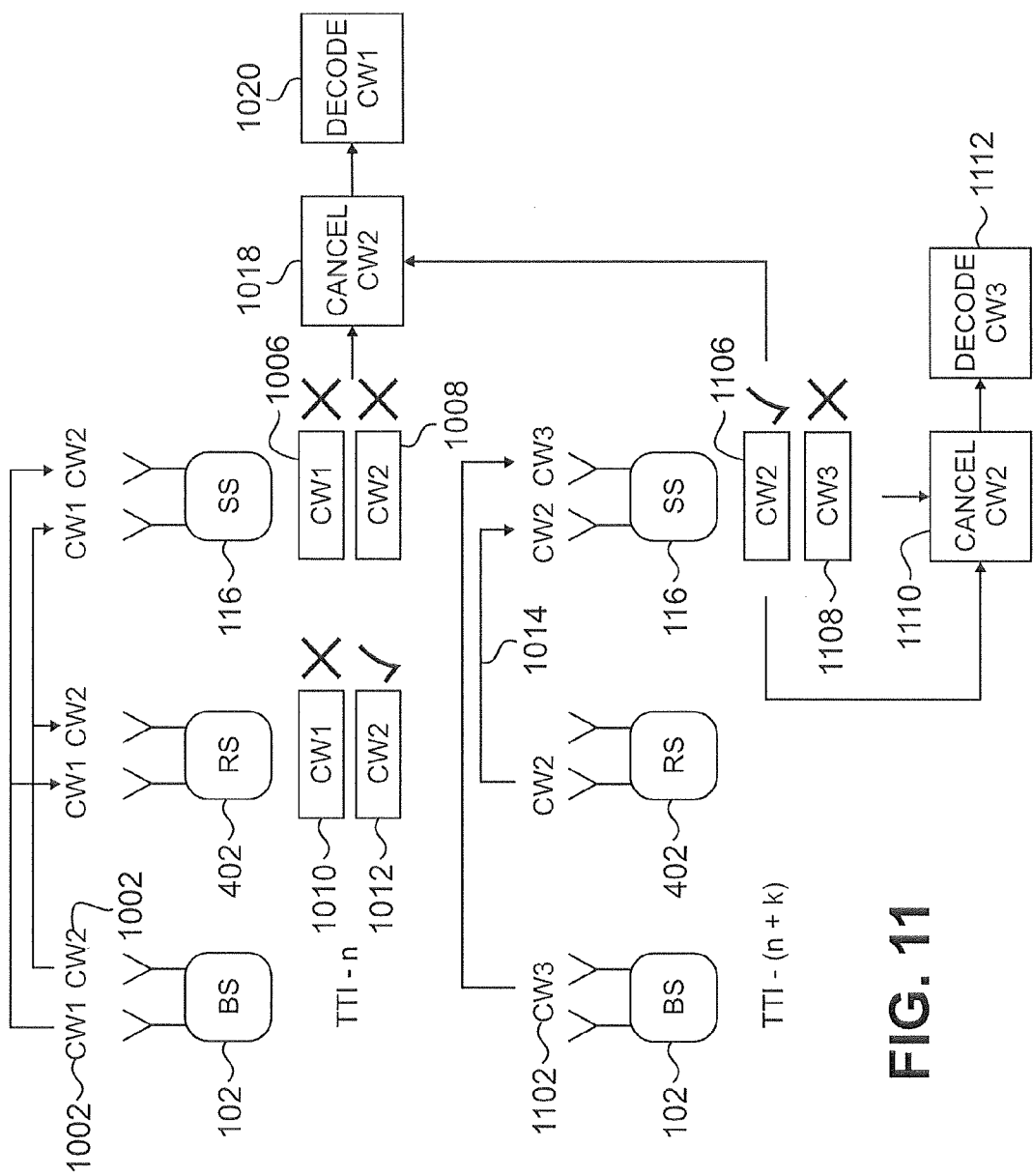
FIG. 11 illustrates RS-assisted communication between BS and SS using MCW MIMO according to one embodiment of the present disclosure.

In another embodiment illustrated in FIG. 11, RS 402 assists BS 102 to SS 116 communication using multi-antenna MIMO hybrid ARQ. BS 102 transmits two codewords, CW1 1002 and CW2 1004 to SS 116 in a first transmission time interval ("TTI-n") over two MIMO layers. RS 402 receives CW1 1002 and CW2 1004. RS 402 attempts to decode CW1 1002 and CW2 1004. RS 402 successfully decodes 1012 CW2 1004 but does not successfully decode 1010 CW1 1002. SS 116 receives CW1 1002 and CW2 1004 in error 1006, 1008. SS 116 stores the received CW1 1002 and CW2 1004 signal in a buffer and sends NAK message signals for CW1 1002 and CW2 1004 to BS 102. RS 402 sends a NAK message signal for CW1 1002 and an ACK message signal for CW2 1004. BS 102 decodes the NAK and ACK signals received from SS 116 and RS 402 respectively. Additionally, RS 402 decodes the NAK signals from SS 116 and determines that SS 116 needs assistance decoding CW1 1002 and CW2 1004. RS 402 forwards (e.g. transmits) 1014 the correctly received codeword CW2 1004 to SS 116 in the next available TTI ("TTI-(n+k)"). Additionally, BS 102 transmits a new codeword, CW3 1102, to SS 116 in the next available TTI ("TTI-(n+k)"). BS 102 transmits CW3 1102 at the same time and over the same resources as RS 402 transmits CW2 1004. SS 116 receives CW2 1004 and CW3 1102 as a two codeword signal. SS 116 successfully decodes 1106 CW2 1004. SS 116 uses the decoded CW2 1004, as in the previous embodiment discussed with respect to FIG. 10, to cancel 1110 the interference caused by CW2 1004 from the CW2 1004 and CW3 1102 signal. After cancelling CW2 1004 from the CW2 1004 and CW3 1102 signal, SS 116 is able to decode 1112 CW3 1102. Alternatively, if SS 116 decodes 1108 CW3 1102 but not CW2 1004, SS 116 can cancel the interference from CW3 1102 to decode CW2 1004. Once SS 116 decodes CW2 1004, SS 116 cancels 1018 CW2 1004 from the stored CW1 1002 and CW2 1004 signal (previously stored in the buffer) received in the first TTI ("TTI-n"). After canceling CW2 1004, SS 116 is able to decode 1020 CW1 1002.

Figure 12:
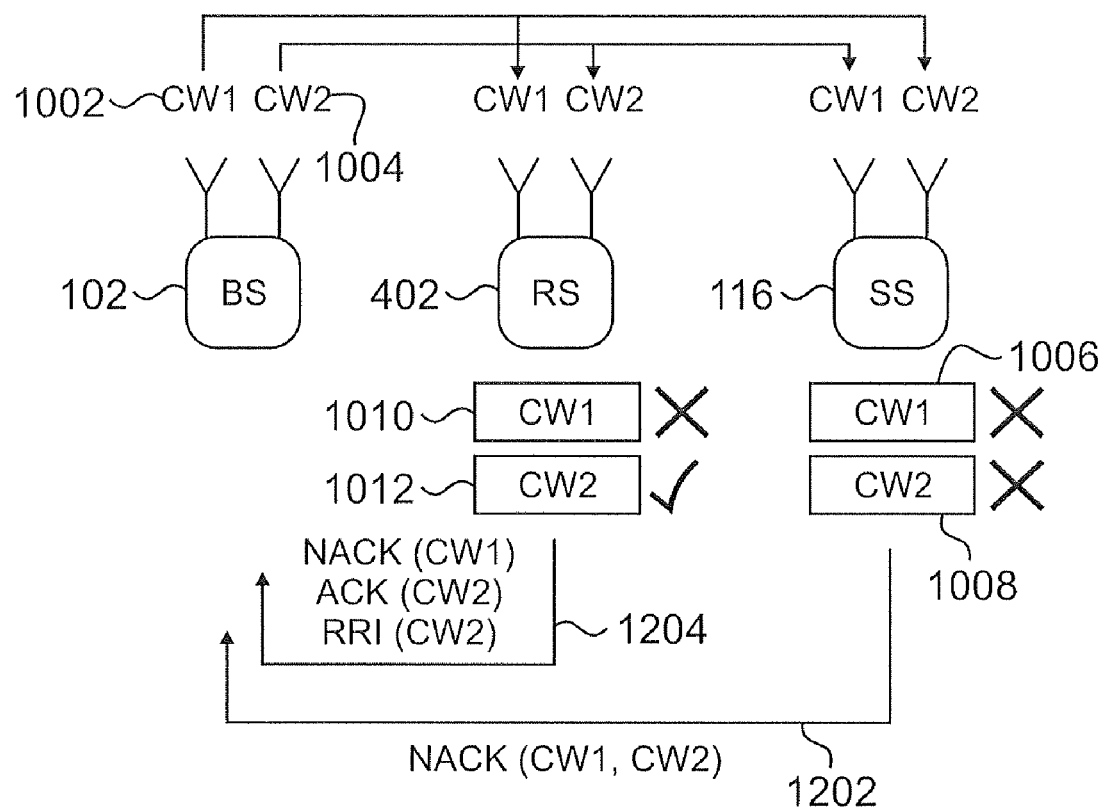
FIG. 12 illustrates ACK/NAK and retransmission resource indication (RRI) signaling in MCW MIMO according to one embodiment of the present disclosure.

In another embodiment illustrated in FIG. 12, RS 402 assists BS 102 to SS 116 communication using multi-antenna MIMO hybrid ARQ. BS 102 transmits two codewords, CW1 1002 and CW2 1004 to SS 116 in a first transmission time interval ("TTI-n") over two MIMO layers. RS 402 receives CW1 1002 and CW2 1004. RS 402 attempts to decode CW1 1002 and CW2 1004. RS 402 successfully decodes 1012 CW2 1004 but does not successfully decode 1010 CW1 1002. SS 116 receives CW1 1002 and CW2 1004 in error 1006, 1008. SS 116 stores the received CW1 1002 and CW2 1004 signal in a buffer and sends NAK message signals for CW1 1002 and CW2 1004 to BS 102. RS 402 decodes the NAK signals from SS 116 and determines that SS 116 needs assistance decoding CW1 1002 and CW2 1004. RS 402 sends NAK message signal for CW1 1002 and an ACK message signal for CW2 1004. RS 402 also sends information regarding what time frequency resources 1204 that RS 402 will utilize for retransmission of CW2 1004. BS 102 decodes the NAK messages received from SS 116 and the NAK message, ACK message and time frequency information 1204 received from RS 402. BS 102 leaves the time frequency resources

1204 to be used by RS 402 free for RS 402 to use to retransmit CW2 1004 to SS 116. Thus, BS 102 may choose not interfere with the retransmission from RS 402. RS 402 forwards (e.g. transmits) 1014 the correctly received codeword CW2 1004 to SS 116 in the next available TTI (TTI-(n+k)) along the time frequency resources 1204 identified. Thereafter, SS 116 is able to decode CW2 1004 and, after decoding CW2 1004, SS 116 uses CW2 1004 to decode CW1 1002 as described herein above with respect to FIGS. 10 and 11.

Figure 13:
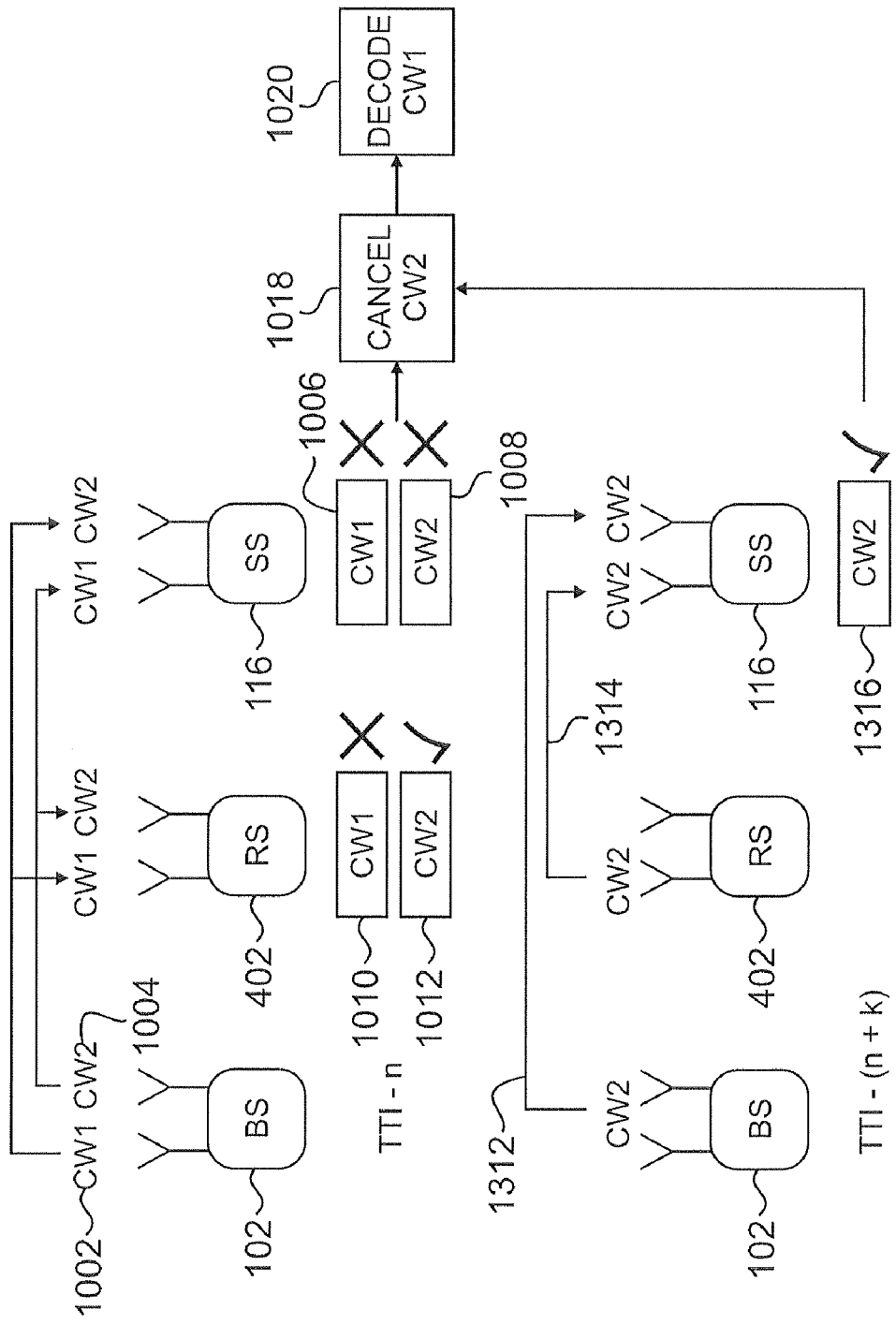
FIG. 13 illustrates RS-assisted communication with both BS and RS retransmitting the missing CW to the SS according to one embodiment of the present disclosure.

In another embodiment illustrated in FIG. 13, BS 102 transmits two codewords, CW1 1002 and CW2 1004 to SS 116 in a first transmission time interval ("TTI-n") over two MIMO layers. RS 402 receives CW1 1002 and CW2 1004. RS 402 attempts to decode CW1 1002 and CW2 1004. RS 402 successfully decodes 1012 CW2 1004 but does not successfully decode 1010 CW1 1002. SS 116 receives CW1 1002 and CW2 1004 in error 1006, 1008. SS 116 stores the received CW1 1002 and CW2 1004 signal in a buffer and sends NAKs for CW1 1002 and CW2 1004 to BS 102. BS 102 decodes the NAK signals received from SS 116. RS 402 decodes the NAK signals from SS 116 and determines that SS 116 needs assistance decoding CW1 1002 and CW2 1004. BS 102 retransmits 1312 CW2 1004 to SS 116 in the next available TTI ("TTI-(n+k)"). Additionally, RS 402 forwards (e.g. transmits) 1314 the correctly received codeword CW2 1004 to SS 116 in the next available TTI ("TTI-(n+k)"). In some embodiments, BS 102 and RS 402 coordinate preceding to be utilized for retransmission of CW2 1004 to increase the received signal for CW2 1004 at SS 116. Thereafter, SS 116 is able to decode 1316 CW2 1004 and, after decoding CW2 1004, SS 116 uses CW2 1004 to decode CW1 1002 as described herein above with respect to FIGS. 10, 11 and 12.

Figure 14:
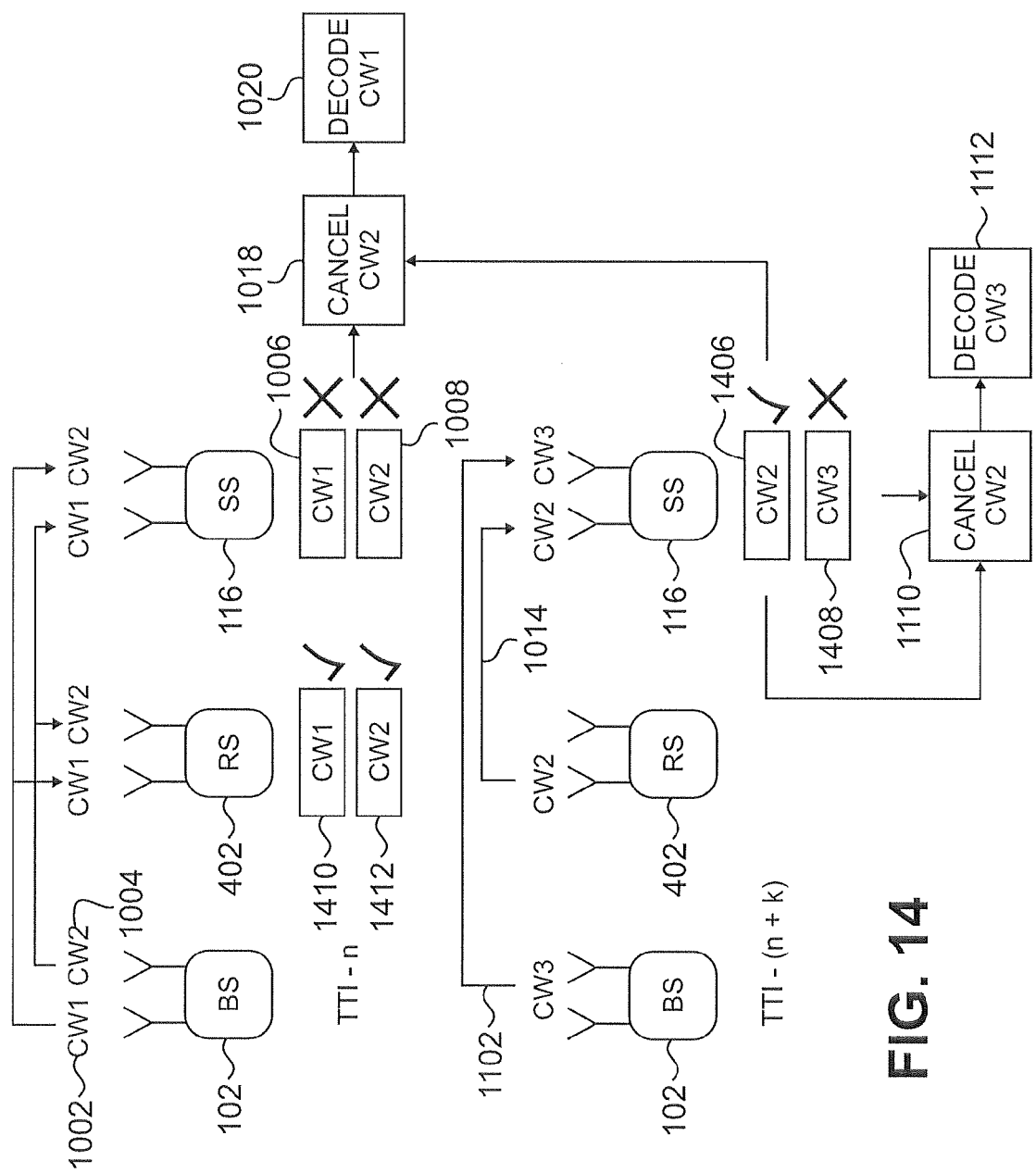
FIG. 14 illustrates RS-assisted communication between BS and SS using MCW MIMO according to one embodiment of the present disclosure.

In an additional embodiment illustrated in FIG. 14, RS 402 assists BS 102 to SS 116 communication using multi-antenna MIMO hybrid ARQ. BS 102 transmits two codewords, CW1 1002 and CW2 1004 to SS 116 in a first transmission time interval ("TTI-n") over two MIMO layers. RS 402 receives CW1 1002 and CW2 1004. RS 402 attempts to decode CW1 1002 and CW2 1004. RS 402 successfully decodes 1410, 1412 CW1 1002 and CW2 1004 respectively. SS 116 receives CW1 1002 and CW2 1004 in error 1006, 1008. SS 116 stores the received CW1 1002 and CW2 1004 signal in a buffer and sends NAKs for CW1 1002 and CW2 1004 to BS 102. RS 402 sends ACK message signals for CW1 1002 and CW2 1004. BS 102 decodes the NAK signals received from SS 116 and ACK signals received from RS 402. Additionally, RS 402 receives and decodes the NAK signals from SS 116 and determines that SS 116 needs assistance decoding CW1 1002 and CW2 1004. RS 402 forwards (e.g. transmits) 1014 codeword CW2 1004 to SS 116 in the next available TTI ("TTI-(n+k)"). RS 402 sends only CW2 1004 to SS 116 such that SS 116 will be able to cancel CW2 1004 and decode CW1 1002. Additionally, BS 102 transmits a new codeword, CW3 1102, to SS 116 in the next available TTI ("TTI-(n+k)"). SS 116 receives CW2 1004 and CW3 1102 as a two codeword signal. SS 116 successfully decodes 1406 CW2 1004. SS 116 uses the decoded CW2 1004, as in the previous embodiment discussed with respect to FIG. 10, to cancel 1110 the interference caused by CW2 1004 from the CW2 1004 and CW3 1102 signal. After cancelling CW2 1004 from the CW2 1004 and CW3 1102 signal, SS 116 is able to decode 1112 CW3 1102. Alternatively, if SS 116 decodes 1408 CW3 1102 but not CW2 1004, SS 116 can cancel the interference from CW3 1102 to decode CW2 1004. Once SS 116 decodes CW2 1004, SS 116 cancels 1018 CW2 1004 from the stored CW1 1002 and CW2 1004 signal (previously stored in the buffer) received in the first TTI. After canceling CW2 1004, SS 116 is able to decode 1020 CW1 1002.

In an additional embodiment, RS 402 retransmits CW1 1002 and CW2 1004. In such embodiment BS 102 may not transmit a new codeword (e.g. CW3 1102) due to limited MIMO layers available in the system.

Figure 15:
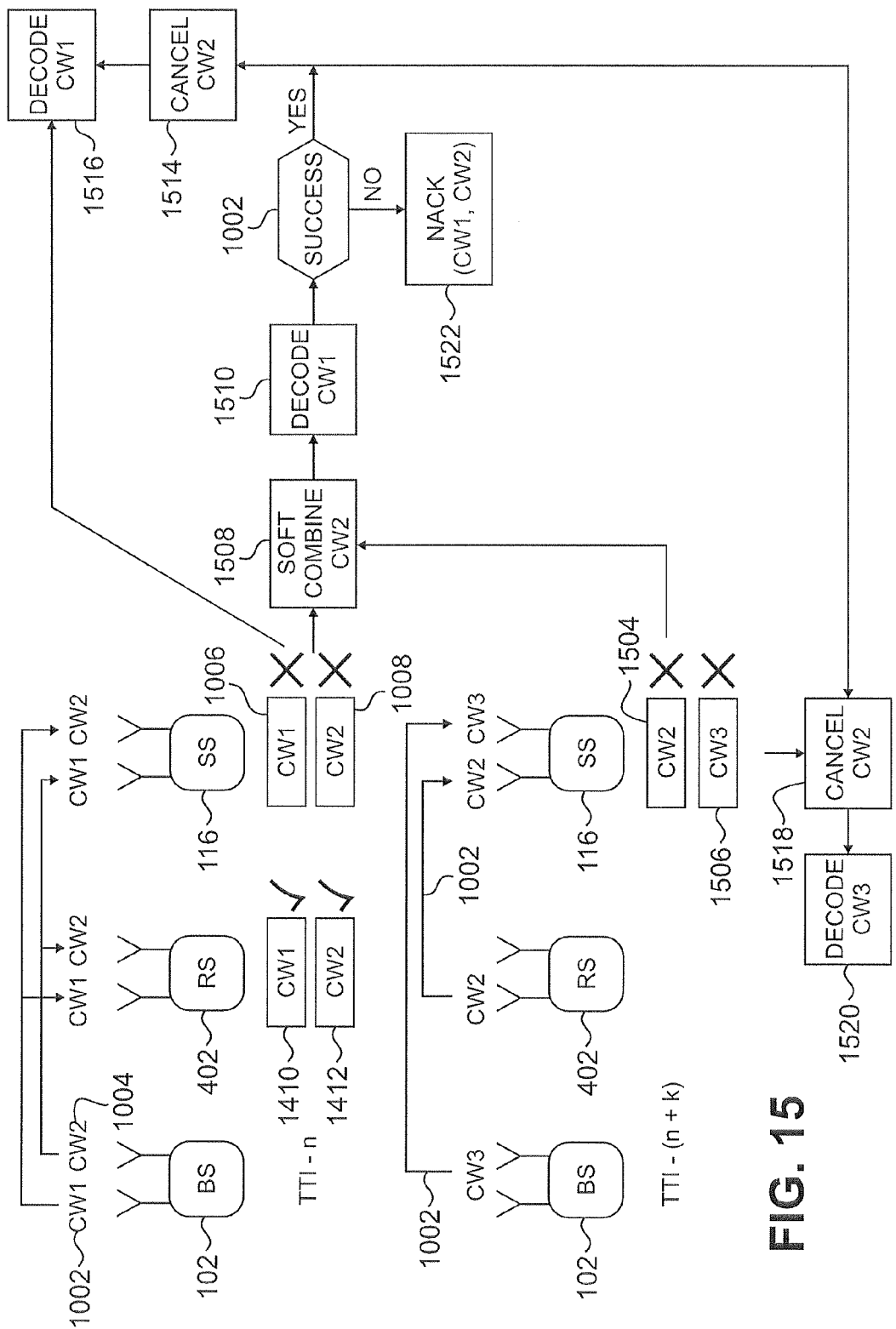
FIG. 15 illustrates RS-assisted communication between BS and SS using MCW MIMO according to one embodiment of the present disclosure.

In another embodiment illustrated in FIG. 15, RS 402 assists BS 102 to SS 116 communication using multi-antenna MIMO hybrid ARQ. BS 102 transmits two codewords, CW1 1002 and CW2 1004 to SS 116 in a first transmission time interval (TTI-n) over two MIMO layers. RS 402 receives CW1 1002 and CW2 1004. RS 402 attempts to decode CW1 1002 and CW2 1004. RS 402 successfully decodes 1410, 1412 CW1 1002 and CW2 1004 respectively. SS 116 receives CW1 1002 and CW2 1004 in error 1006, 1008. SS 116 stores the received CW1 1002 and CW2 1004 signal in a buffer and sends NAKs for CW1 1002 and CW2 1004 to BS 102. RS 402 sends an ACK message signals for CW1 1002 and for CW2 1004. BS 102 decodes the NAKs received from SS 116 and ACK signals received from RS 402. Additionally, RS 402 receives and decodes the NAK signals from SS 116 and determines that SS 116 needs assistance decoding CW1 1002 and CW2 1004. RS 402 forwards (e.g. transmits) 1014 codeword CW2 1004 to SS 116 in the next available TTI ("TTI-(n+k)"). RS 402 sends only CW2 1004 to SS 116 such that SS 116 will be able to cancel CW2 1004 and decode CW1 1002. Additionally, BS 102 transmits the new codeword, CW3 1102, to SS 116 in the next available TTI ("TTI-(n+k)"). SS 116 receives CW2 1004 and CW3 1102 as a two codeword signal. SS 116 does not successfully decode 1504 CW2 1004. SS 116 also does not successfully decode 1506 CW3 1102. Thereafter SS 116 soft combines 1508, using HARQ principles, the repeated codeword, CW2 1004. SS 116 soft combines 1508 the CW2 1004 received from BS 102 in the first TTI ("TTI-n") with the CW2 1004 received from RS 402 in the next available TTI ("TTI-(n+k)") to attempt to decode 1510 CW2 1004. If SS 116 successfully decodes 1512 CW2 1004, SS 116 uses the decoded CW2 1004, as in the previous embodiment discussed with respect to FIG. 10, to cancel 1514 the interference caused by CW2 1004 from the CW1 1002 and CW2 1004 signal received in the first TTI ("TTI-n"). After cancelling CW2 1004 from the CW1 1002 and CW2 1004 signal, SS 116 is able to decode 1516 CW1 1002. Additionally, SS 116 uses decoded CW2 1004 to cancel 1518 the interference caused by CW2 1004 from the CW2 1004 and CW3 1102 signal received in the next available TTI ("TTI-(n+k)"). After cancelling CW2 1004 from the CW2 1004 and CW3 1102 signal, SS 116 is able to decode 1520 Cw3 1102. Alternatively, if SS 116 fails to decode 1512 CW2 1102, SS 116 generates and transmits a NAK message signal 1522 to BS 102 and RS 402.

In another embodiment (not specifically illustrated), the number of HARQ processor at HARQ operation for a data packet that originate from a first communication node and terminate at a second communication node can be more than one (1). In the case of multiple HARQ processors, a scheduler at RS 402 or BS 102 is adapted to prioritize the HARQ processors for transmission and/or retransmission by weighting the processors as "high priority", "average priority", or "low priority". For example, if six (6) HARQ processors are utilized, two (2) of the processors are weighted as "high priority", two (2) of the processors are weighted as "average priority", and two (2) of the processors are weighted as "low priority". The weight may be related to a latency requirement, a data rate, or another Quality of Service ("QOS") measure. As such, when parallel HARQ processes are running, some of the HARQ processes are scheduled to occur earlier than other processes. In some embodiments, prioritizing processors are utilized when a User Equipment ("UE" or SS) is running multimedia service/applications. Additional embodiments are applicable to other relay networks in which HARQ operation may span across multiple hops. These embodiments incorporate operations within either a TDD system or an FDD system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for data communication in a Hybrid Automatic Repeat Request (HARQ) network, the method comprising:
    transmitting to a first communication node, by a second communication node, a first acknowledgement message received from a third communication node while simultaneously transmitting, to the third communication node, a first data packet received from the first communication node.

2. The method of claim 1, further comprising:
    receiving, by the second communication node, a second data packet from the first communication node; and
    simultaneously receiving, by the second communication node, a second acknowledgement message from the third communication node, wherein the second acknowledgement is an acknowledgement of receipt of the first data packet.

3. The method of claim 2, further comprising:
    receiving, by the second communication node, the first data packet transmitted by the first communication node in a first transmission time interval;
    receiving, by the second communication node, the second data packet transmitted by the first communication node in a second transmission time interval; and
    transmitting, by the second communication node, the first acknowledgment message at a transmission time interval prior to the second transmission time interval.

4. The method of claim 1, wherein transmitting to the third communication node by the second communication node further comprises:
    decoding the first data packet received from the first communication node;
    recoding the first data packet as a second version data packet; and
    transmitting the second version data packet to the third communication node.

5. The method of claim 1, wherein the second communication node is a relay station.

6. The method of claim 1, wherein the third communication node is a subscriber station.

7. The method of claim 1, wherein the first communication node is a base station.

8. A method for data communication in a Hybrid Automatic Repeat Request (HARQ) network, the method comprising:
    receiving, by a relay station, a plurality of data bits as a first version of a communication packet from a base station;
    recoding, by the relay station, the plurality of data bits as a second version of the communication packet;
    receiving, by the relay station, a negative acknowledgement message from a subscriber station; and
    responsive to receiving the negative acknowledgement message from the subscriber station, transmitting, by the relay station, the second version of the communication packet to the subscriber station.

9. The method of claim 8, further comprising:
    responsive to receiving the negative acknowledgement message from the subscriber station, identifying that that the subscriber station was not able to decode the communication packet sent by the base station.

10. The method of claim 9, wherein the subscriber station combines the second version of the communication packet with the first version to decode the communication packet.

11. The method of claim 8, wherein the relay station is a subscriber station.

12. The method of claim 8, wherein the step of transmitting further comprises simultaneously transmitting, by the base station, a first version of the communication packet and a second version of the communication packet.

13. An apparatus for relaying data communication in a Hybrid Automatic Repeat Request (HARQ) network, the apparatus comprising:
    a plurality of transmitters antennas configured to simultaneously transmit a first acknowledgement message to a first communication node and a first data packet to a second communication node;
    a plurality of receiver antennas configured to simultaneously receive a second data packet from the first communication node and a second acknowledgement signal from the second communication node; and
    a decoder configured to decode data packets transmitted from the first communications node.

14. The apparatus as set forth in claim 13, further comprising a plurality of HARQ processors.

15. The apparatus as set forth in claim 14, further comprising a scheduler for prioritizing each of the plurality of HARQ processors.

16. The apparatus as set forth in claim 13, further comprising an encoder for re-encoding the second data packet transmitted from the first communications node for re-transmission to the second communications node.

17. A system for data communication in a Hybrid Automatic Repeat Request (HARQ) network, the system comprising:
    a first communication node comprising:
        an encoder configured to encode a number of data packets,
        a plurality of transmitting antennas configured to transmit a number of data packets, and
        a plurality of receiving antennas configured to receive a number of first acknowledgement messages associated with ones of the number of data packets transmitted by said first communication node;
    a second communication node comprising:
        a plurality of transmitters antennas configured to simultaneously transmit said acknowledgment messages to said first communication node and retransmit said number of data packets to a third communication node;
        a plurality of receiver antennas configured to simultaneously receive said number of data packets from the first communication node and a number of second acknowledgement signals from said third communication node; and
        a decoder for decoding said number data packets transmitted from the first communications node.

18. The system as set forth in claim 17, wherein said first communication node further comprises a circular buffer configured to determine versions of said number of data packets to be transmitted and wherein said second communication node further comprises a circular buffer configured to determine versions of said number of data packets to be re-transmitted.

19. The system as set forth in claim 18, wherein said first communication node is configured to transmit a first of said number of data packets in a first transmission time interval, transmit a second of said number of data packets in a second transmission time interval and receive an acknowledgement signal acknowledging receipt of said first of said number of data packets by one of said second communication node and said third communication node.

20. A method for data communication in a Multiple-Input Multiple-Output (MIMO) Hybrid Automatic Repeat Request (HARQ) network, the method comprising:
   receiving a first communication from a first communication node, the first communication comprising a first codeword and a second codeword; decoding the second codeword;
   transmitting a negative acknowledgement signal, wherein the negative acknowledgement signal indicates a non-successful decoding of the first codeword and the second codeword;
   receiving a second communication, the second communication comprising a retransmission of the second codeword transmitted from a second communication node in response to transmitting the negative acknowledgement signal;
   decoding the retransmitted second codeword; and
   canceling the decoded second codeword from the first communication in order to decode the first codeword.

21. The method of claim 20, wherein receiving the second communication further comprises a third codeword transmitted from the first communication node.

22. The method of claim 21, the method further comprising:
   decoding at least one of the retransmitted second codeword and the third codeword;
   utilizing the decoded at least one of the retransmitted second codeword and the third codeword to decode the other codeword from the second communication; and
   cancelling the second codeword from the first communication in order to decode the first codeword.

23. The method of claim 21, the method further comprising:
   unsuccessfully decoding the retransmitted second codeword; and
   soft combining the un-decoded second codeword from the first communication and the un-decoded second codeword from the second communication in order to decode the second codeword.

24. The method of claim 23, the method further comprising:
   cancelling the second codeword from the first communication; and
   decoding the first codeword.

25. The method of claim 24, the method further comprising:
   cancelling the second codeword from the second communication; and
   decoding the third codeword.

26. The method of claim 20, wherein receiving the second communication further comprises the second codeword re-transmitted from the first communication node.

27. A system for data communication in a Multiple-Input Multiple-Output (MIMO) Hybrid Automatic Repeat Request (HARQ) network, said system comprising:
   a first communication node configured to transmit a plurality of data packets to a second communication node and a third communication node during a first transmission time interval, said plurality of data packets comprising at least a first data packet and a second data packet; and
   said second communication node configured to receive said plurality of data packets from said first communication node and, during a second transmission time interval, re-transmit at least said first data packet to said third communication node in response to receiving a NAK signal from said third communication node.

28. The system of claim 27, wherein the second communication node is further configured to transmit a resource request to said first communication node.

29. The system of claim 28, wherein said first communication node is further configured to allocate resources for use by said second communication node in response to receiving said resource request.

30. The system of claim 27, wherein the first communication node is further configured to transmit a third data packet to said third communication node during said second transmission time interval.

31. The system of claim 27, wherein said first communication node is further configured to retransmit, during said second transmission time interval, said second data packet to said third communication node.

32. The system of claim 31, wherein said first communication node is further configured to coordinate a precoding operation with said second communication node.

33. An apparatus for data communication in a Multiple-Input Multiple-Output (MIMO) Hybrid Automatic Repeat Request (HARQ) network, the apparatus comprising:
   a receiver unit configured to receive a first communication from a first communication node, said first communication comprising a first codeword and a second codeword;
   a decoding unit configured to attempt to decode said first codeword and said second codeword; and
   a transmitting unit configured to transmit a negative acknowledgement signal, wherein said negative acknowledgement signal indicates a non-successful decoding of said first codeword and said second codeword; and
   wherein said receiving unit is further configured to receive a second communication from a second communication node in response to transmitting said negative acknowledgement signal, said second communication comprising a retransmission of said second codeword, wherein said decoder is further configured to decode said retransmitted second codeword; and
   a processor control unit configured to cancel said decoded second codeword from said first communication in order for said decoding unit to decode the first codeword.

34. The apparatus of claim 33, wherein the receiving unit is further configured to receive in said second communication a third codeword transmitted from said first communication node.

35. The apparatus of claim 34, wherein said decoder is configured to decode at least one of said retransmitted second codeword and the third codeword and said processor is configured to cancel said decoded at least one of said retransmitted second codeword and third codeword to decode the other codeword from said second communication, and wherein said processor control unit is further configured to cancel said second codeword from said first communication in order to decode said first codeword.

36. The apparatus of claim 34, wherein said processor control unit, in response to an unsuccessful decoding of said retransmitted second codeword, is configured to soft combine said un-decoded second codeword from said first communication and said un-decoded second codeword from said second communication in order to decode said second codeword.

37. The apparatus of claim 33, wherein said processor control unit is configured to cancel said second codeword from said first communication; and decode said first codeword.

38. The apparatus of claim 37, wherein said processor control unit is configured to cancel said second codeword from said second communication; and decode a third codeword.

39. The apparatus of claim 33, wherein the receiving unit is further configured to receive said second communication including said second codeword re-transmitted from said first communication node.

* * * * *